US010997759B2

(12) United States Patent
Choi et al.

(10) Patent No.: US 10,997,759 B2
(45) Date of Patent: May 4, 2021

(54) USER INTERFACE APPARATUS FOR VEHICLE AND VEHICLE

(71) Applicant: LG Electronics Inc., Seoul (KR)

(72) Inventors: Sunghwan Choi, Seoul (KR); Ilwan Kim, Seoul (KR); Jaeho Lee, Seoul (KR); Dukyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/854,932

(22) Filed: Dec. 27, 2017

(65) Prior Publication Data

US 2018/0322673 A1 Nov. 8, 2018

(30) Foreign Application Priority Data

May 8, 2017 (KR) .................. 10-2017-0057451

(51) Int. Cl.
*G06T 11/60* (2006.01)
*G06T 3/00* (2006.01)
*G06T 3/20* (2006.01)
*G06T 5/00* (2006.01)
*G06K 9/00* (2006.01)
(Continued)

(52) U.S. Cl.
CPC ............... *G06T 11/60* (2013.01); *B60R 1/00* (2013.01); *G01P 15/08* (2013.01); *G02B 27/0101* (2013.01); *G06K 9/00798* (2013.01); *G06K 9/00805* (2013.01); *G06T 3/0093* (2013.01); *G06T 3/20* (2013.01); *G06T 5/002* (2013.01); *B60R 2300/205* (2013.01); *B60R 2300/302* (2013.01); *B60R 2300/306* (2013.01); *G02B 2027/014* (2013.01); *G02B 2027/0138* (2013.01); *G02B 2027/0141* (2013.01); *G02B 2027/0183* (2013.01)

(58) Field of Classification Search
CPC ......... G06T 11/60; G06T 3/0093; G06T 3/20; G06T 5/002; B60R 1/00; B60R 2300/205; B60R 2300/302; B60R 2300/306; G01P 15/08; G02B 27/0101; G02B 2027/0138; G02B 2027/014; G02B 2027/0141; G02B 2027/0183; G06K 9/00798; G06K 9/00805
See application file for complete search history.

(56) References Cited

U.S. PATENT DOCUMENTS

2012/0087546 A1* 4/2012 Focke ................. G06T 3/00
382/104
2016/0155267 A1* 6/2016 Bean ................. G02B 27/017
345/633

FOREIGN PATENT DOCUMENTS

JP 2009250827 A 10/2009
JP 2015226304 A 12/2015
(Continued)

*Primary Examiner* — Chong Wu
(74) *Attorney, Agent, or Firm* — Fish & Richardson P.C.

(57) ABSTRACT

A user interface apparatus for a vehicle includes: an interface unit; a display unit configured to project an augmented reality (AR) graphic object onto a screen; at least one processor; and a computer-readable medium coupled to the at least one processor having stored thereon instructions which, when executed by the at least one processor, causes the at least one processor to perform operations including: acquiring, through the interface unit, front view image information and vehicle motion information; based on the front view image information, generating the AR graphic object; and based on the vehicle motion information, warping the AR graphic object.

20 Claims, 23 Drawing Sheets

(51) Int. Cl.
*G01P 15/08* (2006.01)
*G02B 27/01* (2006.01)
*B60R 1/00* (2006.01)

(56) References Cited

FOREIGN PATENT DOCUMENTS

| | | |
|---|---|---|
| JP | 2017013590 A | 1/2017 |
| KR | 10-2014-0008425 | 1/2014 |
| KR | 2016136932 A | 11/2016 |
| WO | WO2016006294 | 1/2016 |

* cited by examiner

USER INTERFACE APPARATUS FOR VEHICLE AND VEHICLE

CROSS-REFERENCE TO RELATED APPLICATION

This application claims the priority benefit of Korean Patent Application No. 10-2017-0057451, filed on May 8, 2017 in the Korean Intellectual Property Office, the disclosure of which is incorporated herein by reference.

TECHNICAL FIELD

The present disclosure relates to a vehicle user interface apparatus for a vehicle, and a vehicle.

BACKGROUND

A vehicle is an apparatus configured to move a user in the user's desired direction. A representative example of a vehicle may be an automobile.

Various types of sensors and electronic devices may be provided in the vehicle to enhance user convenience. For example, a Head Up Display (HUD) may be provided to display a graphic object using Augmented Reality (AR) technology. In addition, Advanced Driver Assistance System (ADAS) is being actively developed for enhancing the user's driving convenience and safety. Further, autonomous vehicles are being actively developed.

SUMMARY

In one aspect, a user interface apparatus for a vehicle includes: an interface unit; a display unit configured to project an augmented reality (AR) graphic object onto a screen; at least one processor; and a computer-readable medium coupled to the at least one processor having stored thereon instructions which, when executed by the at least one processor, causes the at least one processor to perform operations including: acquiring, through the interface unit, front view image information and vehicle motion information; based on the front view image information, generating the AR graphic object; and based on the vehicle motion information, warping the AR graphic object.

Implementations may include one or more of the following features. For example, acquiring the front view image information and the vehicle motion information includes: receiving, from a first camera of the vehicle, the front view image information, and the operations further include: based on the front view image information, generating first motion information associated with a first motion of the vehicle, the first motion information being defined with respect to a first coordinate system.

In some implementations, the operations include: receiving, through the interface unit, vehicle motion sensing information from an Inertial Measurement Unit (IMU) of the vehicle; and based on the vehicle motion sensing information, generating second motion information associated with a second motion of the vehicle, the second motion information being defined with respect to a second coordinate system different from the first coordinate system.

In some implementations, warping the AR graphic object includes: transforming the second motion information to be defined with respect to the first coordinate system; and compensating the first motion information based on the transformed second motion information.

In some implementations, compensating the first motion information based on the transformed second motion information includes: counteracting the second motion of the vehicle in the first motion information.

In some implementations, warping the AR graphic object includes: changing, through the display unit, a location of the AR graphic object projected onto the screen based on the compensated first motion information.

In some implementations, changing the location of the AR graphic object projected onto the screen based on the compensated first motion information includes: based on the compensated first motion information, determining a first motion direction of the vehicle; and changing the location of the AR graphic object in a direction opposite to the first motion direction of the vehicle.

In some implementations, changing the location of the AR graphic object projected onto the screen based on the compensated first motion information includes: based on the compensated first motion information, determining a first displacement magnitude of the vehicle; and changing the location of the AR graphic object in correspondence to the first displacement magnitude of the vehicle.

In some implementations, the operations include: based on the vehicle motion information, determining a change in a motion of the vehicle; and based on the determination of the change in the motion of the vehicle, adding a graphical effect to the AR graphic objects.

In some implementations, the graphical effect includes one or more of fade-out effect or blur effect.

In some implementations, the operations include: acquiring, through the interface unit, vehicle pitch information associated with a change in a pitch of the vehicle; and warping the AR graphic object based on the vehicle pitch information.

In some implementations, the operations include: acquiring, through the interface unit, vehicle yaw information associated with a change in yaw of the vehicle which is generated when a steering wheel is rotated; and warping the AR graphic object based on the vehicle yaw information.

In some implementations, the user interface apparatus further includes a second camera configured to capture images of eyes of a user of the vehicle, and the operations include: based on the captured images, detecting the eyes of the user; tracking a change in a location of the eyes of the user in response to a motion of the vehicle; and warping the AR graphic object based on the tracked change in the location of the eyes of the user.

In some implementations, the operations include: based on the front view image information, generating frontal object information associated with an object located forward of the vehicle; determining a first time corresponding to an estimated time of arrival of the vehicle at the object; and changing, through the display unit, a location of the AR graphic object projected onto the screen based on the first time.

In some implementations, the operations include: determining that the object is a bump; based on the determination that the object is a bump, acquiring height information of the bump; and based on the height information, generating, within the first time, a first anticipated motion information associated with a first anticipated motion of the vehicle at the bump.

In some implementations, the operations include: receiving, through the interface unit, vehicle motion sensing information associated with the bump from an Inertial Measurement Unit (IMU); based on the vehicle motion sensing information, generating second motion information associated with the bump; and compensating the first anticipated motion information based on the second motion information.

In some implementations, the operations include: determining that the object is a curved section; based on the determination that the object is a curved section, acquiring curvature information of the curved section; and based on the curvature information, generating, within the first time, a second anticipated motion information associated with a second anticipated motion of the vehicle at the curved section.

In some implementations, the display unit includes: an imaging unit configured to output the AR graphic object; a flat mirror configured to reflect the AR graphic object; and a concave mirror configured to reflect the AR graphic object reflected by the flat mirror toward the screen.

In some implementations, the display unit further includes a flat mirror drive unit configured to adjust a position of the flat mirror, and the operations include: warping the AR graphic object by adjusting, through the flat mirror drive unit, the position of the flat mirror.

In another aspect, a vehicle includes: a plurality of wheels; a power source configured to drive at least one of the plurality of wheels; and the user interface apparatus.

In some scenarios, according to some implementations of the present disclosure, one or more of the following effects may be achieved.

First, a spatial correspondence of a displayed AR graphic object to a real object can be improved in presence of vehicle movement. As such, perceived realism by a user may be improved.

Second, through improved spatial correspondence, information may be provided to the user in a more accurate manner.

Effects of the present invention should not be limited to the aforementioned effects and other unmentioned effects will be clearly understood by those skilled in the art from the claims. The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

In a conventional Head Up Display (HUD), a user may perceive that an Augmented Reality (AR) object deviates from a corresponding real object in presence of a vehicle movement. As such, implementations are disclosed herein that may improve a spatial correspondence of a displayed AR graphic object to a real object in presence of the vehicle movement.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 1:
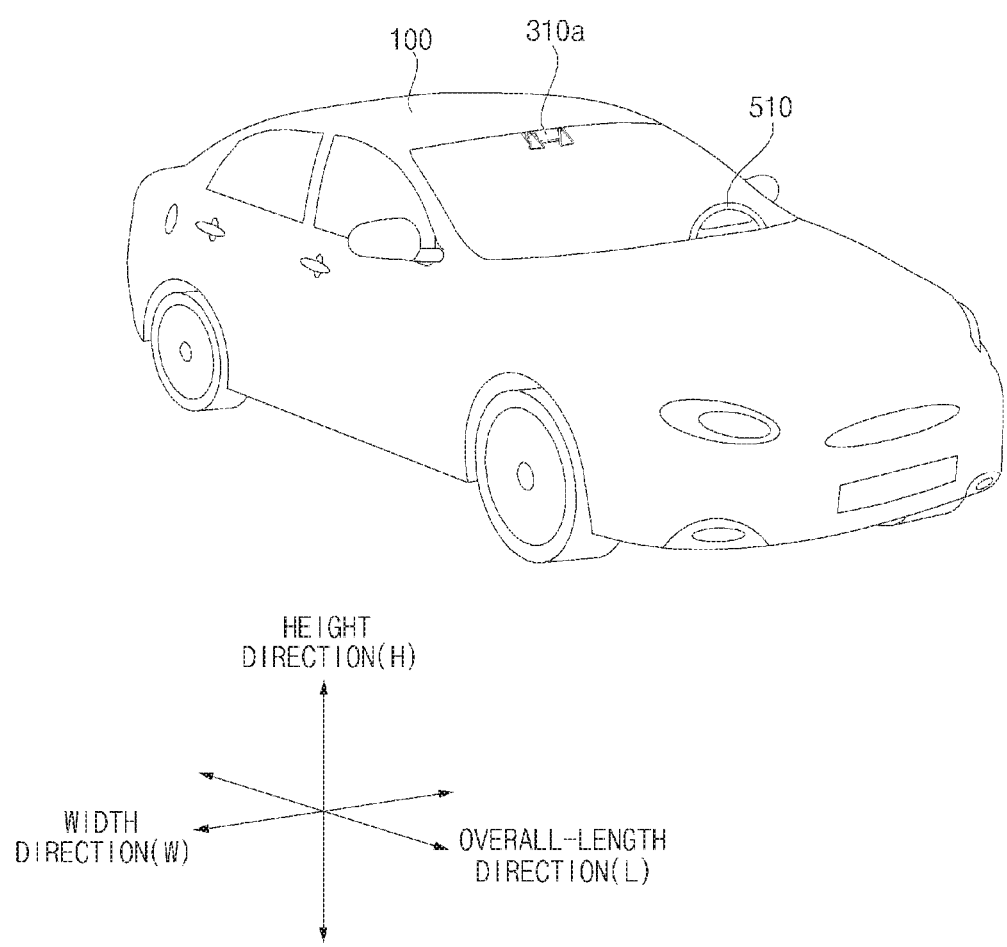
FIG. 1 is a diagram illustrating an example of an exterior of a vehicle.
Figure 2:
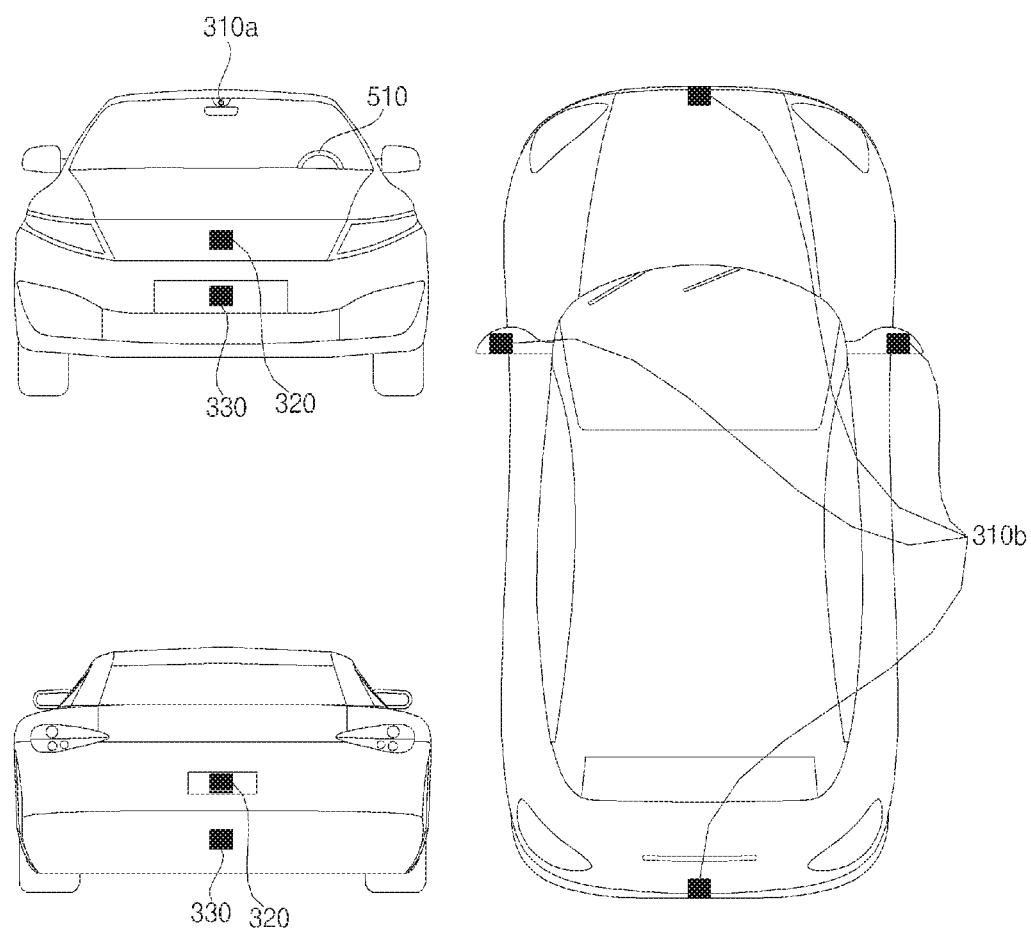
FIG. 2 is a diagram illustrating an example of a vehicle at various angles.
Figure 3:
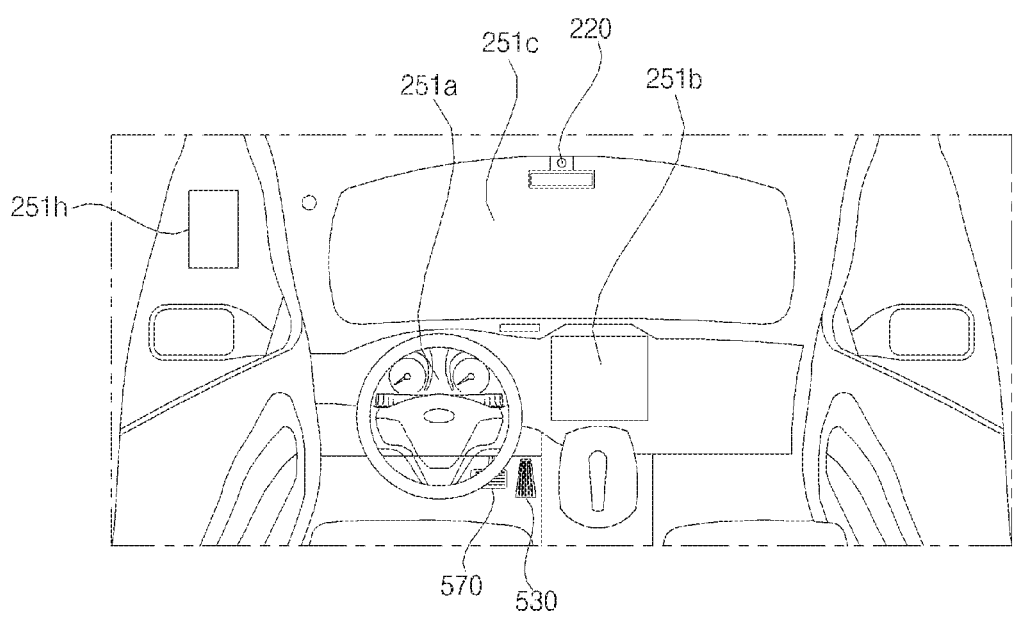
FIGS. 3 and 4 are views illustrating an interior portion of an example of a vehicle.
Figure 4:
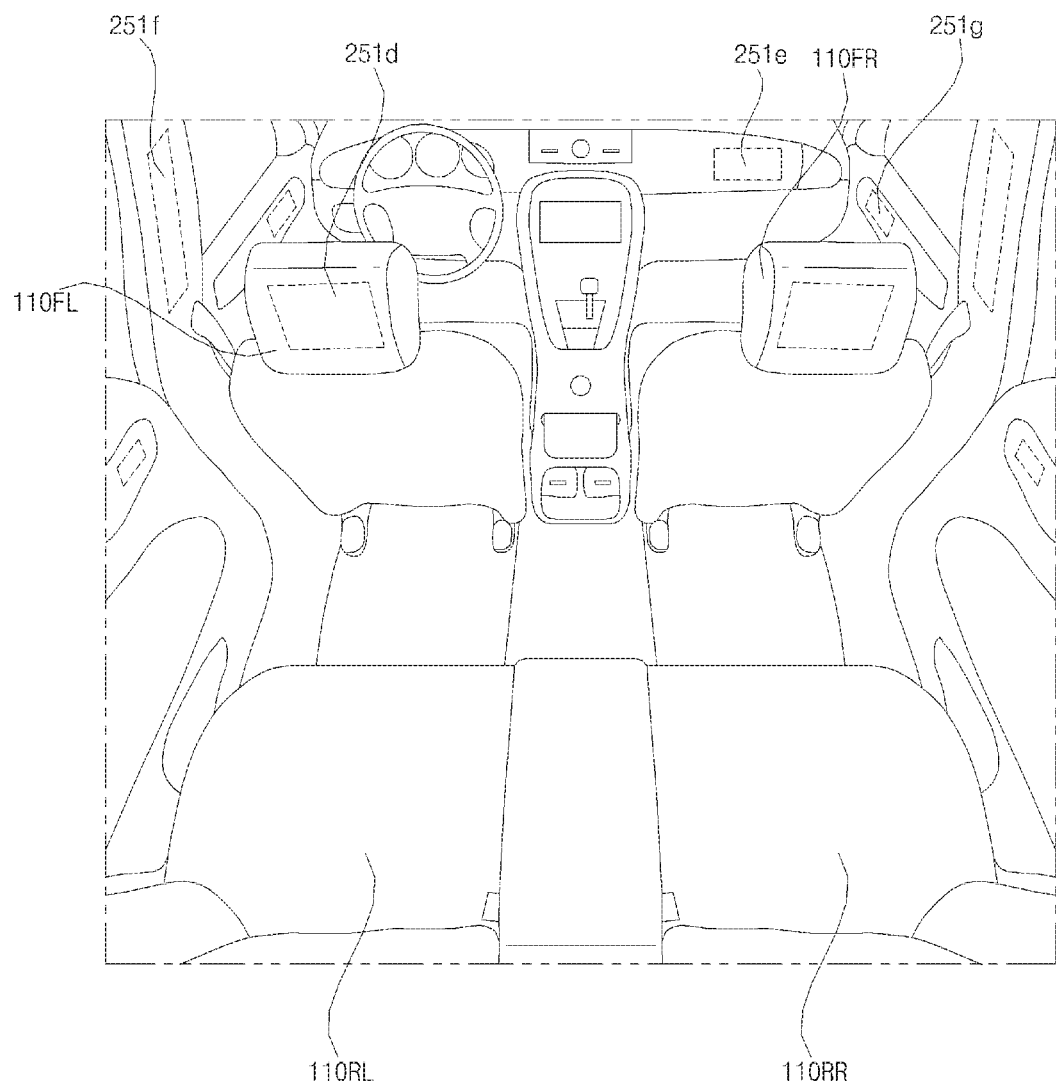
Figure 5:
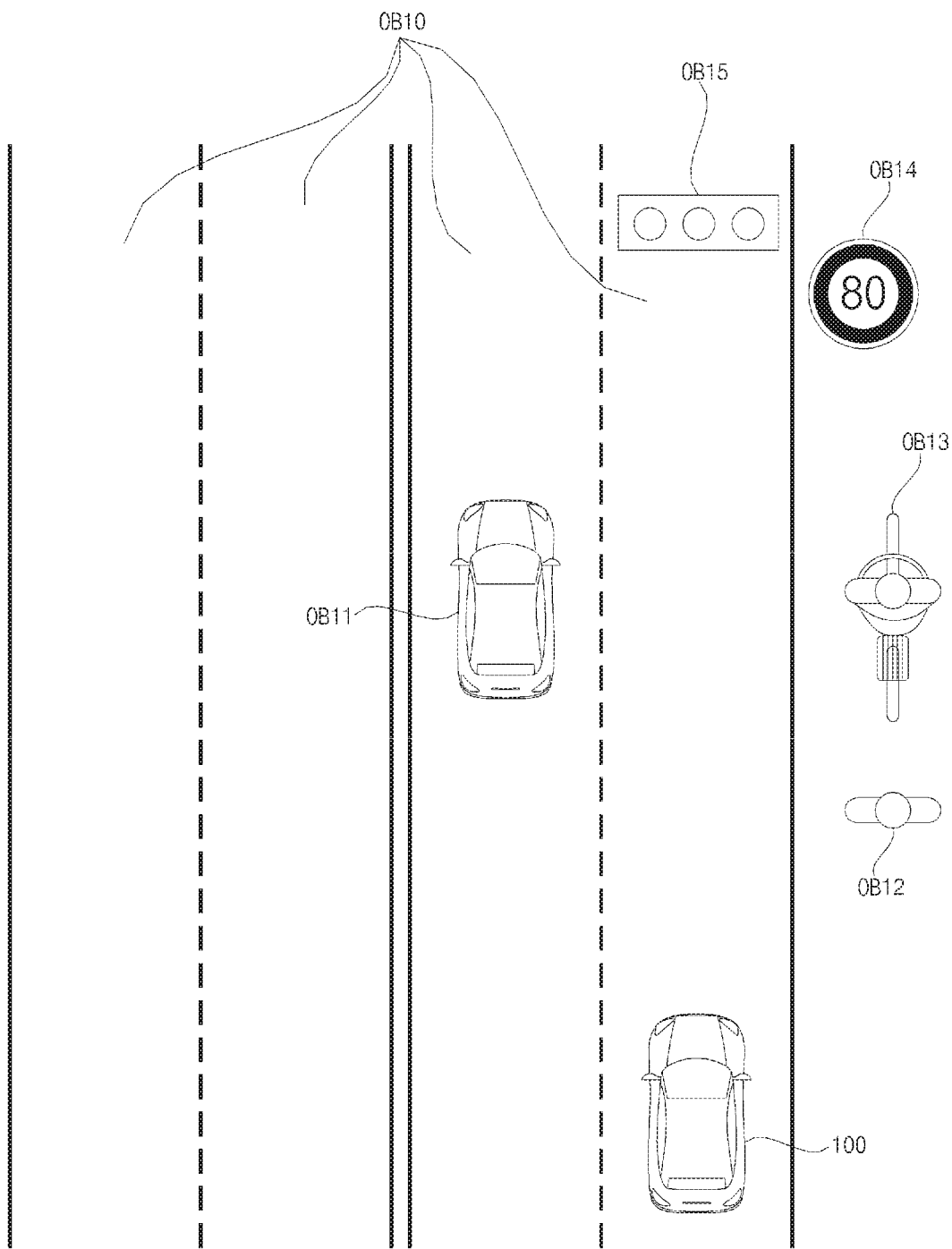
FIGS. 5 and 6 are reference views illustrating examples of objects that are relevant to driving.
Figure 6:
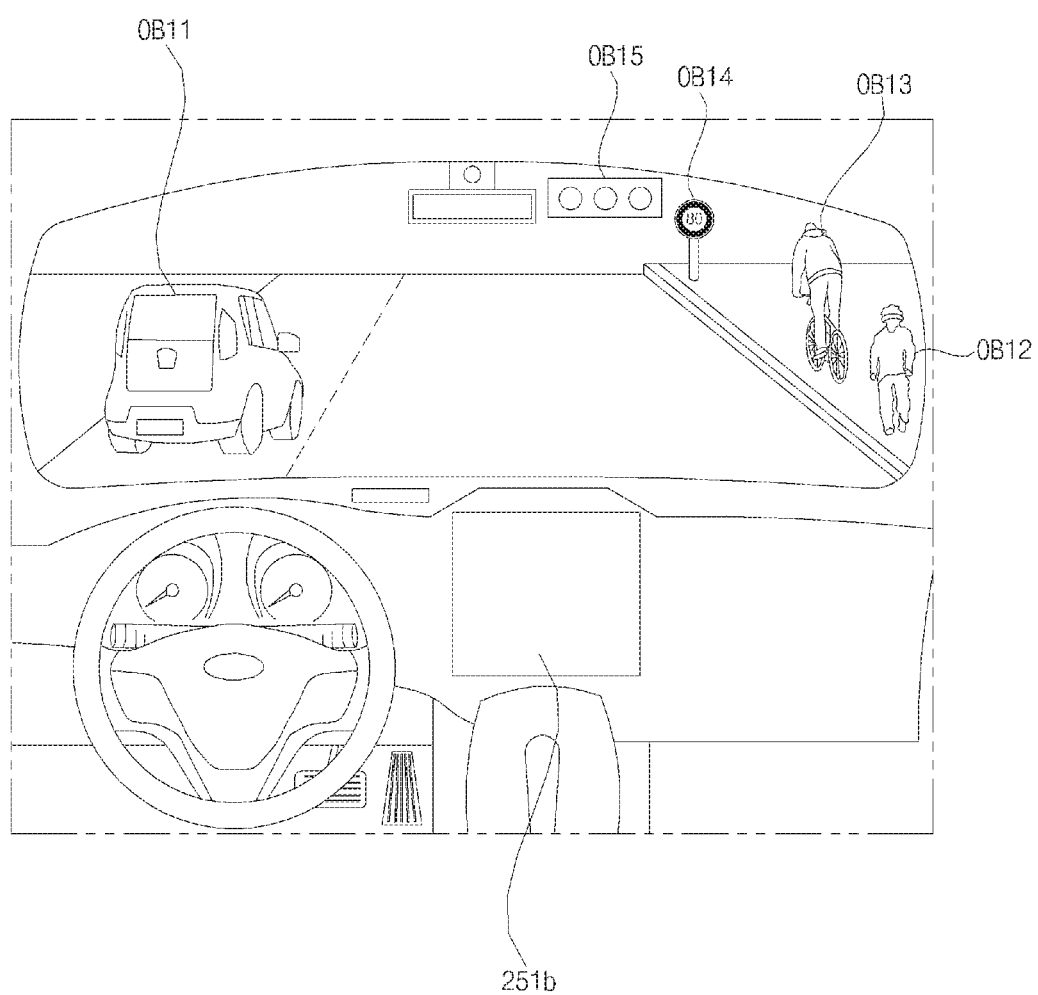
Figure 7:
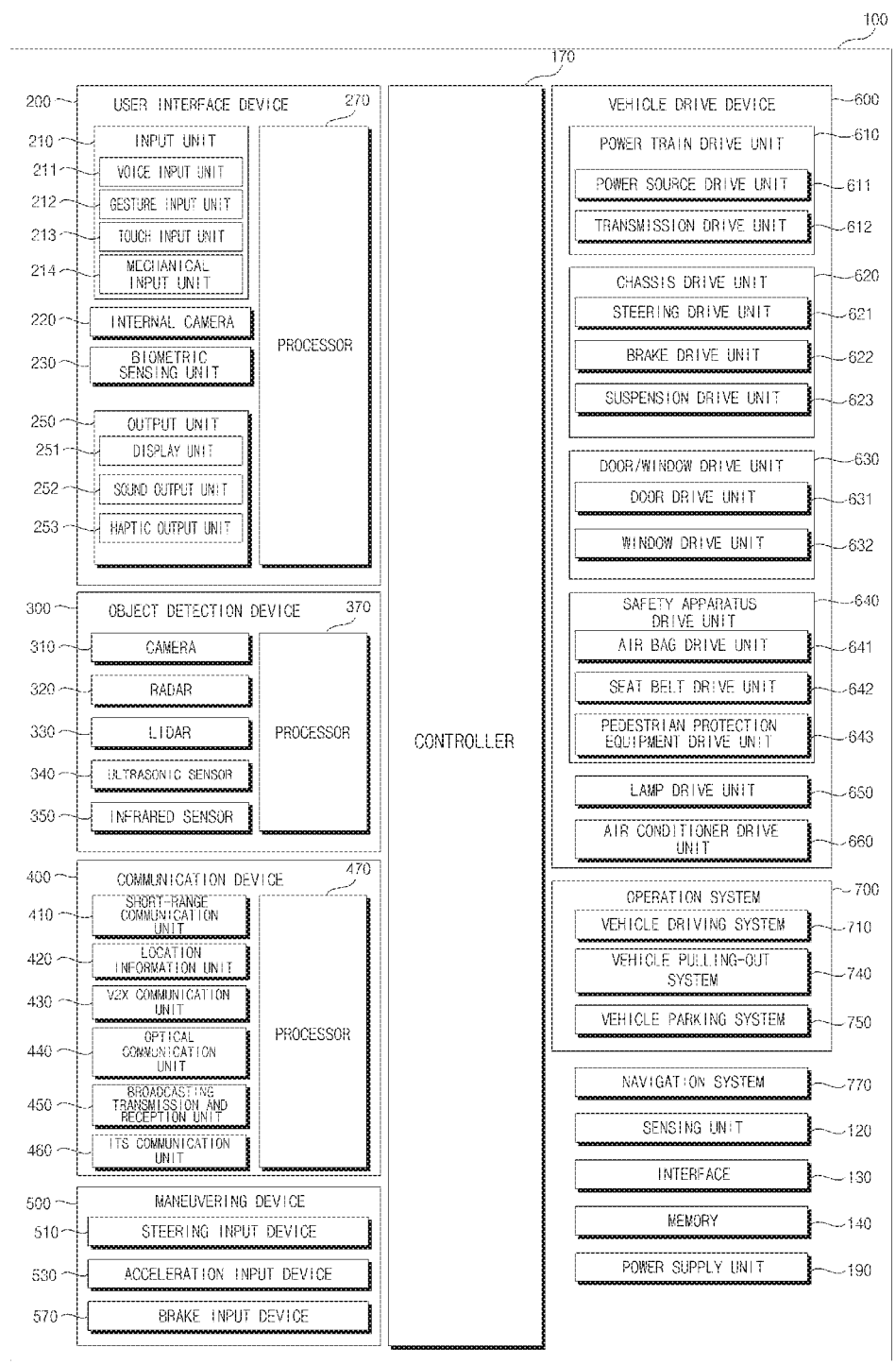
FIG. 7 is a block diagram illustrating subsystems of an example of a vehicle.

FIG. 1 is a diagram illustrating an example of an exterior of a vehicle. FIG. 2 is a diagram illustrating an example of a vehicle at various angles. FIGS. 3 and 4 are views illustrating an interior portion of an example of a vehicle. FIGS. 5 and 6 are reference views illustrating examples of objects that are relevant to driving. FIG. 7 is a block diagram illustrating subsystems of an example of a vehicle.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may switch to an autonomous driving mode or a manual mode in response to a user input.

For example, in response to a user input received through a user interface apparatus 200, the vehicle 100 may switch from a manual mode to an autonomous driving mode, or vice versa.

The vehicle 100 may switch to the autonomous driving mode or to the manual mode based on driving situation information.

The driving situation information may include at least one of the following: information on an object located outside the vehicle 100, navigation information, and vehicle state information.

For example, the vehicle 100 may switch from the manual mode to the autonomous driving mode, or vice versa, based on driving situation information generated by the object detection apparatus 300.

For example, the vehicle 100 may switch from the manual mode to the autonomous driving mode, or vice versa, based on driving situation information received through a communication apparatus 400.

The vehicle 100 may switch from the manual mode to the autonomous driving mode, or vice versa, based on information, data, and a signal provided from an external device.

When the vehicle 100 operates in the autonomous driving mode, the autonomous vehicle 100 may operate based on a vehicle travel system 700.

For example, the autonomous vehicle 100 may operate based on information, data, or signals generated by a driving system 710, a parking-out system 740, and a parking system 750.

While operating in the manual mode, the autonomous vehicle 100 may receive a user input for driving of the vehicle 100 through a driving manipulation apparatus 500. In response to the user input received through the driving manipulation apparatus 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface apparatus 200, the object detection apparatus 300, the communication apparatus 400, the driving manipulation apparatus 500, a vehicle drive apparatus 600, the vehicle travel system 700, a navigation system 770, a sensing unit 120, an interface 130, a memory 140, a controller 170, and a power supply unit 190.

In some implementations, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and a processor 270.

In some implementations, the user interface apparatus 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense a 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some implementations, the user interface apparatus 200 may include a plurality of processors 270 or may not include the processor 270.

In the case where the user interface apparatus 200 does not include the processor 270, the user interface apparatus 200 may operate under control of the controller 170 or a processor of a different device inside the vehicle 100.

In some implementations, the user interface apparatus 200 may be referred to as a display device for vehicle.

The user interface apparatus 200 may operate under control of the controller 170.

The object detection apparatus 300 is configured to detect an object outside the vehicle 100. The object detection apparatus 300 may generate information on the object based on sensing data.

The information on the object may include information about the presence of the object, location information of the object, information on a distance between the vehicle 100 and the object, and information on a speed of movement of the vehicle 100 relative to the object.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling, a lane next to the lane in which the vehicle 100 is traveling, or a lane in which a different vehicle is travelling in the opposite direction. The lane OB10 may include left and right lines that define the lane. The lane may include, for example, an intersection.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person located in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

In some implementations, the object may be classified as a movable object or a stationary object. For example, the movable object may include, for example, a moving nearby vehicle and a moving pedestrian. For example, the stationary object may include, for example, a traffic signal, a road, a structure, a stopped nearby vehicle, and a stopped pedestrian.

The object detection apparatus 300 may include a camera 310, a radar 320, a lidar 330, an ultrasonic sensor 340, an infrared sensor 350, and a processor 370.

In some implementations, the object detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 may acquire location information of an object, information on a distance to the object, and information on speed relative to the object.

For example, based on change in size over time of an object in acquired images, the camera 310 may acquire information on a distance to the object and information on speed relative to the object.

For example, the camera 310 may acquire the information on a distance to the object and the information on speed relative to the object, by using a pin hole model or profiling a road surface.

For example, the camera 310 may acquire the information on a distance to the object and the information on the speed relative to the object, based on information on disparity in stereo images acquired by a stereo camera 310*a*.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100. The vehicle 100 may include a plurality of non-driving type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect or classify an object by comparing pre-stored data with data sensed by the camera 310, the radar 320, the lidar 330, the ultrasonic sensor 340, and the infrared sensor 350.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

For example, the processor 370 may acquire information on the distance to the object or information on the speed relative to the object by using a pin hole model or by profiling a road surface.

For example, the processor 370 may acquire information on the distance to the object and information on the speed relative to the object based on information on disparity in stereo images acquired from the stereo camera 310*a*.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some implementations, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In the case where the object detection apparatus 300 does not include the processor 370, the object detection apparatus 300 may operate under control of the controller 170 or a processor inside the vehicle 100.

The object detection apparatus 300 may operate under control of the controller 170.

The communication apparatus 400 is configured to perform communication with an external device. Here, the external device may be a nearby vehicle, a mobile terminal, or a server.

To perform communication, the communication apparatus 400 may include at least one selected from among a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic volume information from the traffic system and provide the traffic volume information to the controller 170. In another example, the ITS communication unit 460 may receive a control signal from the traffic system, and provide the control signal to the controller 170 or a processor provided in the vehicle 100.

The processor 470 may control the overall operation of each unit of the communication apparatus 400.

In some implementations, the communication apparatus 400 may include a plurality of processors 470, or may not include the processor 470.

In the case where the communication apparatus 400 does not include the processor 470, the communication apparatus 400 may operate under control of the controller 170 or a processor of a device inside of the vehicle 100.

In some implementations, the communication apparatus 400 may implement a vehicle display device, together with the user interface apparatus 200. In this case, the vehicle display device may be referred to as a telematics device or an Audio Video Navigation (AVN) device.

The communication apparatus 400 may operate under control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation apparatus 500 may operate under control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive apparatus 600 may further include other components in addition to the aforementioned components, or may not include some of the aforementioned components.

In some implementations, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In the case where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In the case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of movement of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may individually control a plurality of suspensions.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include a processor. Each unit of the vehicle dive device 600 may include its own processor.

The vehicle drive apparatus 600 may operate under control of the controller 170.

The vehicle travel system 700 is a system for controlling the overall driving operation of the vehicle 100. The vehicle travel system 700 may operate in the autonomous driving mode.

The vehicle travel system 700 may include the driving system 710, the parking-out system 740, and the parking system 750.

In some implementations, the vehicle travel system 700 may further include other components in addition to the aforementioned components, or may not include some of the aforementioned component.

In some implementations, the vehicle travel system 700 may include a processor. Each unit of the vehicle travel system 700 may include its own processor.

In some implementations, where the vehicle travel system 700 is implemented as software, the vehicle travel system 700 may be implemented by the controller 170.

In some implementations, in some implementations, the vehicle travel system 700 may include, for example, at least one selected from among the user interface apparatus 270, the object detection apparatus 300, the communication apparatus 400, the driving manipulation apparatus 500, the vehicle drive apparatus 600, the navigation system 770, the sensing unit 120, and the controller 170.

The driving system 710 may perform driving of the vehicle 100.

The driving system 710 may perform driving of the vehicle 100 by providing a control signal to the vehicle drive apparatus 600 based on navigation information from the navigation system 770.

The driving system 710 may perform driving of the vehicle 100 by providing a control signal to the vehicle drive apparatus 600 based on information on an object received from the object detection apparatus 300.

The driving system 710 may perform driving of the vehicle 100 by providing a control signal to the vehicle drive apparatus 600 based on a signal from an external device through the communication apparatus 400.

The driving system 710 may be a system which includes at least one of the user interface apparatus 270, the object detection apparatus 300, the communication apparatus 400, the driving manipulation apparatus 500, the vehicle driving device 600, the navigation system 770, the sensing unit 120, and the controller 170, and which performs driving of the vehicle 100.

The driving system 710 may be referred to as a vehicle driving control apparatus.

The parking-out system 740 may perform an operation of pulling the vehicle 100 out of a parking space.

The parking-out system 740 may perform an operation of pulling the vehicle 100 out of a parking space, by providing a control signal to the vehicle drive apparatus 600 based on navigation information from the navigation system 770.

The parking-out system 740 may perform an operation of pulling the vehicle 100 out of a parking space, by providing a control signal to the vehicle drive apparatus 600 based on information on an object received from the object detection apparatus 300.

The parking-out system 740 may perform an operation of pulling the vehicle 100 out of a parking space, by providing a control signal to the vehicle drive apparatus 600 based on a signal received from an external device.

The parking-out system 740 may be a system which includes at least one of the user interface apparatus 270, the object detection apparatus 300, the communication apparatus 400, the driving manipulation apparatus 500, the vehicle driving device 600, the navigation system 770, the sensing unit 120, and the controller 170, and which performs an operation of pulling the vehicle 100 out of a parking space.

The parking-out system 740 may be referred to as a vehicle parking-out control apparatus.

The parking system 750 may perform an operation of parking the vehicle 100 in a parking space.

The parking system 750 may perform an operation of parking the vehicle 100 in a parking space, by providing a control signal to the vehicle drive apparatus 600 based on navigation information from the navigation system 770.

The parking system 750 may perform an operation of parking the vehicle 100 in a parking space, by providing a control signal to the vehicle drive apparatus 600 based on information on an object received from the object detection apparatus 300.

The parking system 750 may perform an operation of parking the vehicle 100 in a parking space, by providing a control signal to the vehicle drive apparatus 600 based on a signal from an external device.

The parking system 750 may be a system which includes at least one of the user interface apparatus 270, the object detection apparatus 300, the communication apparatus 400, the driving manipulation apparatus 500, the vehicle driving device 600, the navigation system 770, the sensing unit 120, and the controller 170, and which performs an operation of parking the vehicle 100.

The parking system 750 may be referred to as a vehicle parking control apparatus.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication apparatus 400.

In some implementations, the navigation system 770 may be classified as an element of the user interface apparatus 200.

The sensing unit 120 may sense the state of the vehicle. The sensing unit 120 may include an Inertial Measurement Unit (IMU) sensor, a collision sensor, a wheel sensor, a speed sensor, a gradient sensor, a weight sensor, a heading sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The IMU sensor may include at least one of an accelerometer, a gyro sensor, and a magnetic sensor.

The sensing unit 120 may acquire sensing signals with regard to, for example, vehicle attitude information, vehicle motion information, vehicle yaw information, vehicle roll information, vehicle pitch information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by various sensors provided inside the vehicle 100.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8A:
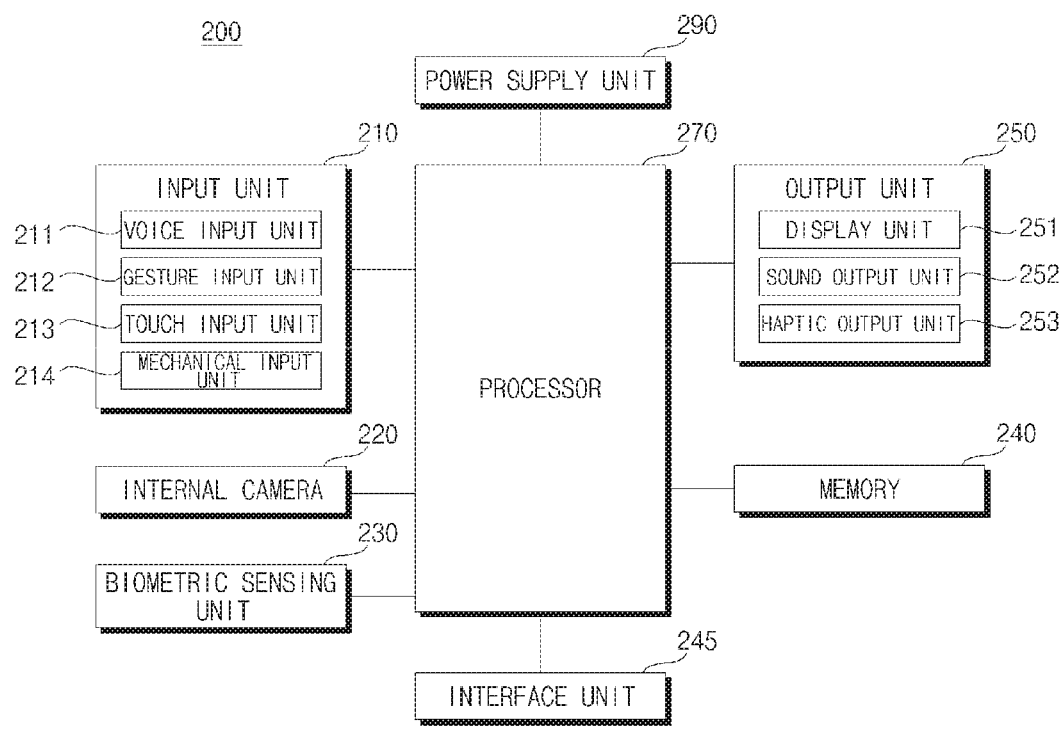
FIG. 8A is a block diagram illustrating a vehicle user interface apparatus according to an implementation of the present disclosure.

FIG. 8A illustrates a vehicle user interface according to an implementation of the present disclosure.

Referring to FIG. 8A, a vehicle user interface 200 may include an input unit 210, an internal camera 220, a biometric sensing unit 230, a memory 240, an interface unit 245, an output unit 250, at least one processor such as a processor 270, and a power supply unit 290.

In some implementations, the user interface apparatus 200 may further include other components to the aforementioned components, or may omit some of the aforementioned components.

The vehicle user interface apparatus 200 shown in FIG. 8A includes the components of the vehicle user interface apparatus 200 shown in FIG. 7. Hereinafter, the same descriptions provided above with reference to FIG. 7 are omitted.

The description provided with reference to FIG. 7 may be applied to the input unit 210 and the biometric sensing unit 230.

The internal camera 220 may acquire an image of the inside of the vehicle 100.

The image of the inside of the vehicle 100 acquired by the internal camera 220 may be transferred to the processor 270.

The memory 240 is electrically connected to the processor 270. The memory 240 may store basic data of each unit, control data for controlling the operation of each unit, and input/output data. The memory 240 may be any of various hardware storage devices, such as a ROM, a RAM, an EPROM, a flash drive, and a hard drive. The memory 240 may store various data for the overall operation of the user interface 200, such as programs for the processing or control of the processor 270.

In some implementations, the memory 240 may be integrated with the processor 270, or may be an element of the processor 270.

The interface unit 245 may exchange information, data, or a signal with a different device included in the vehicle 100. The interface unit 245 may transmit the received information, data, or signal to the processor 270. The interface unit 245 may transmit information, data, or a signal generated or processed by the processor 270 to a different device included in the vehicle 100. The interface unit 245 may receive information, data, or a signal from a different device included in the vehicle 100.

The interface unit 245 may receive front view image information from the object detection apparatus 300.

The interface unit 245 may receive driving situation information.

The interface unit 245 may receive information on an object located outside the vehicle 100 from the object detection apparatus 300.

For example, the interface unit 245 may receive information on an object located in front of vehicle 100.

The interface unit 245 may receive navigation information from the navigation system 770.

The interface unit 245 may receive vehicle state information from the sensing unit 120.

For example, the interface unit 245 may receive information on a motion of the vehicle 100 from the sensing unit 120.

Information, data, or a signal received by the interface unit 245 may be provided to the processor 270.

The output unit 250 may include a display unit 251, a sound output unit 252, and a haptic output unit 253.

The description as described above with reference to FIG. 7 may be applied to the output unit 250. Hereinafter, the description mainly about the display unit 251 is provided.

The display unit 251 may operate under control of the processor 270.

The display unit 251 may project a graphic object onto a screen.

For example, the display unit 251 may project an Augmented Reality (AR) graphic object onto the screen.

The screen may be formed of a transparent material.

The screen may be one region or the entire region of a windshield.

The screen may be a combiner provided inside of the vehicle 100.

The processor 270 may control the overall operation of each unit of the user interface apparatus 200.

The processor 270 may acquire front view image information through the interface unit 245.

The front view image information may include front view image data, object information acquired based on a front view image of a vehicle, and vehicle motion information acquired based on the front view image of the vehicle.

The processor 270 may receive front view image information from the camera 310 (see FIG. 7) installed at the vehicle 100 through the interface unit 245.

If the camera 310 is a stereo camera, the processor 270 may receive three-dimensional (3D) information which is based on disparity information.

The processor 270 may acquire information on a first motion of the vehicle 100 relative to a first coordinate system, the information which is generated based on vehicle image information.

For example, the first coordinate system may be the world coordinate system.

In some implementations, the information on the first motion may be generated by the object detection apparatus 300. Additionally, or alternatively, the first motion information may be generated by the processor 270 of the user interface apparatus 200.

The processor 270 may acquire information on a motion of the vehicle 100 through the interface unit 245.

The information on a motion of the vehicle 100 may include information on whether a movement of the vehicle 100 has occurred, information on a displacement (magnitude) of movement of the vehicle 100, information on a direction of movement of the vehicle 100, information on a speed of movement of the vehicle 100, and vehicle attitude information.

The processor 270 may receive sensing information through the interface unit 245 from the IMU sensor installed in the vehicle 100. The sensing information may include inertial sensing information and gyro sensing information.

The processor 270 may acquire information on a second motion of the vehicle 100 relative to a second coordinate system, based on sensing information.

For example, the second coordinate system may be the local coordinate system of the IMU sensor.

In some implementations, the information on the second motion may be generated by the sensing unit 120. Alternatively, or additionally, second motion information may be generated by the processor 270 of the user interface apparatus 200.

The processor 270 may generate an AR graphic object based on front view image information.

The processor 270 may project a generated AR graphic object onto a screen.

For example, the processor 270 may project an AR graphic object onto a screen located on a virtual line connecting a user's eyes and an object. In this case, when the user look toward the object, the user may be able to see the AR graphic object corresponding to the object. When seen from the perspective of the user, the displayed AR graphic object may overlap with the object, surround the object, or otherwise be displayed in connection with the object.

The processor 270 may warp an AR graphic object based on vehicle motion information. Warping of the AR graphic object may be referred to as a vision compensation. The processor 270 may perform vision compensation on the AR graphic object based on the vehicle motion information.

Warping of an AR graphic object can include application of various mathematical transformation to compensate for visual disparity of a user. A visual disparity experienced by a user may refer to a sense of disconnect, lack of correspondence, or incongruity between the AR graphic object and the corresponding real object. Examples of mathematical transformation include affine transformation, projective transformation, linear transformation, and nonlinear transformation.

Based on the vehicle motion information, the processor 270 may control the display unit 251 to change a location of the AR graphic object to be projected on the screen.

For example, based on vehicle motion information, the processor 270 may control the imaging unit 910 or the flat mirror 920 (see FIGS. 9A and 9B) to change a location of an AR graphic object to be projected on the screen.

The processor 270 may convert information on a second motion of the vehicle 100 relative to the second coordinate system to be relative to the first coordinate system.

The processor 270 may correct information on a first motion of the vehicle 100 based on the converted information on the second motion.

In some implementations, the information on the second motion from the IMU sensor may be acquired more quickly than the information on the first motion from the camera 310.

For example, the camera 310 first acquires front view images, which does not directly provide information related to movement of the vehicle. Based on the acquired front view images, the camera may generate the information on the first motion, for example, by performing an object detection process on the acquired front view images and determining the first motion of the vehicle through determining an apparent movement of the objects. However, such generation of the first motion information is an indirect process that involves first acquiring two or more images followed by processing of the acquired images. Such steps take time to perform, which causes a delay in generation of the first motion information. Furthermore, it may not be possible to accurately distinguish a movement of a moving object from the motion of the car.

On the other hand, the IMU may generate second motion information by performing direct and real time measurement of the vehicle motion. As such, the second motion information may be provided the processor more quickly than the first motion information. Furthermore, as the second motion information may be generated at or close to real time, the second motion information may be used to compensate the first motion information.

As such, if an AR graphic object is moved based on the information on the first motion during travelling of the vehicle 100, movement of the AR graphic object may be delayed. In this case, the AR graphic object may cause a user to feel a sense of incongruity.

If information on a first motion is corrected based on information on a second motion and an AR graphic object is moved based on corrected information on the first motion, a delay associated with the movement of an AR graphic object can be reduced. In this case, the AR graphic object may provide a realistic AR experience to the user.

In some implementations, the information on the first motion and the information on the second motion may be based on different reference coordinate systems.

The first processor 270 may match the reference coordinate systems of the information on the first motion and the information on the second motion.

Specifically, the processor 270 may convert the second coordinate system, which is a reference of the information on the second motion, into the first coordinate system which is a reference of the information on the first motion.

For example, the processor 270 may convert the information on the second motion relative to the local coordinate system to be relative to the world coordinate system which is a reference of the information on the first motion. Such conversion may be performed, for example, using mathematical coordinate transformations.

The processor 270 may match the information on the first motion the information on the second motion with each other in terms of scale.

The processor 270 may reflect variation in movement of the vehicle 100, which is determined based on the information on the second motion, to the information on the first motion. For example, the second motion of the vehicle can be counteracted in the first motion information. Such counteracting, for example, can reduce the effect of the second motion of the vehicle in visual perception of the AR graphic objects by the user.

In some implementations, if a variation in movement of the vehicle 100 determined based on the information on the second motion is equal to or greater than a reference value, the processor 270 may reflect the variation in movement of the vehicle 100 in the information on the first motion.

The processor 270 may change a location of an AR graphic object based on corrected information on a first motion to be projected onto the screen.

For example, the processor 270 may control the display unit 251 so that a location of an AR graphic object is changed in a direction opposite to a direction of movement of the vehicle 100 determined based on corrected information on a first motion.

For example, the processor 270 may control the display unit 251 so that a location of an AR graphic object is changed in correspondence to a displacement (e.g., magnitude) of movement of the vehicle 100 determined based on corrected information on a first motion. For example, the location can be changed in proportion to the displacement.

For example, the processor 270 may control the display unit 251 so that a location of an AR graphic object is changed in proportion of a speed of movement of the vehicle 100 determined based on corrected information on a first motion.

For example, the processor 270 may control the display unit 251 so that a location of an AR graphic object is changed at a speed slower than a speed of movement of the vehicle 100 determined based on corrected information on a first motion. In this case, by providing enough time for a user's eyes to adapt movement of the AR graphic object, a sense of incongruity by the user may be reduced or eliminated.

In some implementations, the processor 270 may, without correcting information on a first motion, control the display unit 251 based on information on a second motion so as to change a location of an AR graphic object to be projected onto the screen.

For example, the processor 270 may control the display unit 251 so that a location of an AR graphic object is changed in a direction opposite to a direction of movement of the vehicle 100 determined based on information on a second motion.

For example, the processor 270 may control the display unit 251 so that a location of an AR graphic object is changed in proportion to a displacement of movement of the vehicle 100 determined based on information on a second motion.

For example, the processor 270 may control the display unit 251 so that a location of an AR graphic object is changed in proportion of a speed of the movement of the vehicle determined based on information on a second motion.

For example, the processor 270 may control the display unit 251 so that a location of an AR graphic object is changed at a speed slower than a speed of movement of the vehicle 100 determined based on information on a second motion.

If it is determined, based on vehicle motion information, that there is a change in movement of the vehicle 100, the processor 270 may add graphic effect to an AR graphic object.

The vehicle motion information may be corrected information on a first motion or information on a second motion.

For example, the graphic effect may be fade-out effect or blur effect.

As the graphic effect is added to the AR graphic object, the AR graphic object moves more smoothly, providing a smoother viewing experience to the user.

Through the interface unit 245, the processor 270 may acquire information on pitch variation of the vehicle 100, the information which is generated when wheels of the vehicle 100 passes a bump (e.g., a speed bump) or a hole (e.g., a pothole).

For example, the processor 270 may acquire, from the object detection apparatus 300, information about a situation in which the vehicle 100 is passing a bump or hole.

For example, the processor 270 may acquire pitch variation information as vehicle motion information from the IMU sensor.

Based on the pitch variation information, the processor 270 may control the display unit 251 so that an AR graphic object is warped.

The processor 270 may acquire, through the interface unit 245, yaw variation information of the vehicle 100 which is generated in response to rotation of a steering wheel.

For example, the processor 270 may acquire information on rotation of the steering wheel from the sensing unit 120.

For example, the processor 270 may acquire yaw variation information as vehicle motion information from the IMU sensor.

The processor 270 may control the display unit 251 based on the yaw variation information so that an entire AR graphic object is warped.

The processor 270 may detect a user's eyes based on an image of the inside of the vehicle 100 acquired from the internal camera 220.

The processor 270 may track variation in the location of the user's eyes in response to a motion of the vehicle 100.

The processor 270 may control the display unit 251 so that an AR graphic object is warped further based on the tracked variation in the location of the user's eyes.

For example, a location of eyes of a user or occupant in the vehicle 100 changes when the vehicle 100 moves. Considering variation in the location of the user's eyes together with the movement of the vehicle 100, it is possible to warp an AR graphic object more accurately.

The processor 270 may acquire, based on a front view image, information on an object located in front of the vehicle 100.

For example, the processor 270 may acquire information on an object in front of the vehicle 100 from the object detection apparatus 300 through the interface unit 245.

The object may be a stationary object or a moving object.

For example, an object may be a bump, a hole, a curved section, or a slope section.

For example, an object may be an obstacle on the road surface.

The processor 270 may acquire timing information on when the vehicle 100 is expected to meet an object.

For example, the processor 270 may acquire, through the interface unit 245, from the object detection apparatus 300, timing information on when the vehicle 100 is expected to meet an object.

For example, the processor 270 may generate the timing information by determining, based on information on an object, a point in time when the vehicle 100 is expected to meet the object.

Further based on the timing information, the processor 270 may control the display unit 251 so that a location of an AR graphic object to be projected onto the screen is changed.

For example, if the object is a bump, the processor 270 may acquire information on a height of the bump from the object detection apparatus 300 through the interface unit 245.

Before a point in time when the vehicle 100 passes the bump, the processor 170 may acquire information on a first motion of the vehicle 100 based on the information on a height of the bump. In this case, the information on the first motion is anticipation information, and the first motion may be referred to as a first anticipated motion. Then, the processor 270 may warp an AR graphic object based on information on the first anticipated motion.

The interface unit 245, the processor 270 may receive sensing information from the IMU sensor installed in the vehicle 100 when the vehicle 100 passes over a bump.

Based on sensing information, the processor 270 may acquire information on a second motion of the vehicle 100.

Based on the information on the second motion, the processor 270 may correct the information on the first anticipated motion.

For example, if an object is a curved section, the processor 270 may acquire curvature information of the curved section from the object detection apparatus 300 or the navigation system 700 through the interface unit 245.

Before a point in time before the vehicle 100 enters the curved section, the processor 270 may acquire information on a first motion of the vehicle 100 based on the curvature information. The information on the first motion is anticipation information, and the first motion may be referred to as a first anticipated motion. Then, the processor 270 may warp an AR graphic object based on information on the first anticipated motion.

When the vehicle 100 enters the curved section, the processor 270 may receive sensing information from the IMU sensor installed in the vehicle 100 through the interface unit 245.

The processor 270 may acquire information on a second motion of the vehicle 100 based on the sensing information.

The processor 270 may correct the information on the first anticipated motion based on the information on the second motion.

Under control of the processor 270, the power supply unit 290 may supply power required for operation of each component. In particular, the power supply unit 290 may receive power from a battery provided inside the vehicle 100.

Figure 8B:
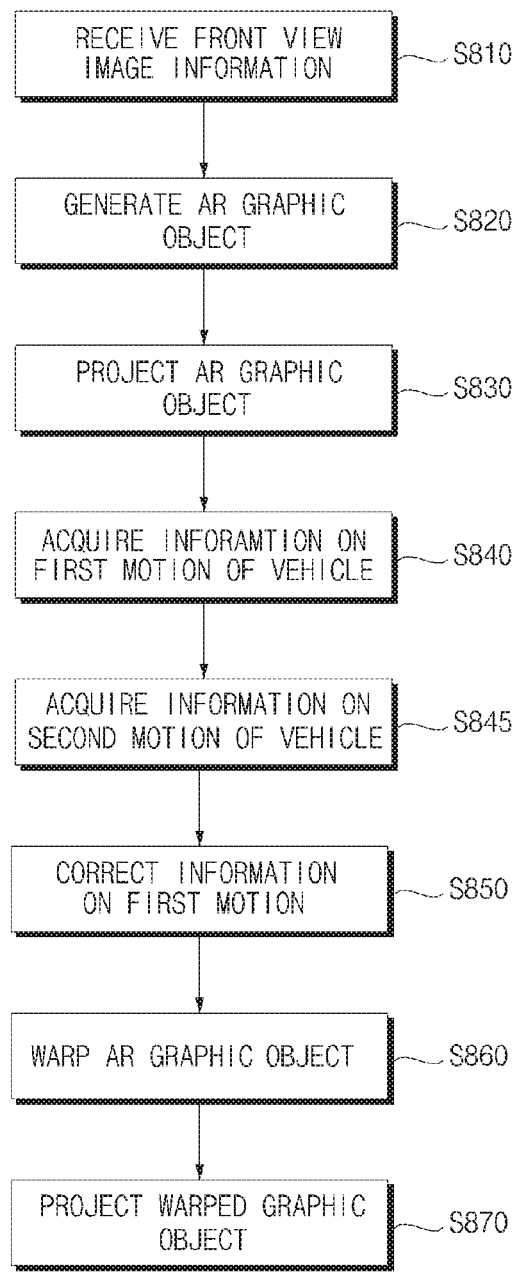
FIG. 8B is a flowchart of an example operation of a user interface apparatus according to an implementation of the present disclosure.

FIG. 8B is a flowchart of an example operation of a user interface apparatus according to an implementation of the present disclosure.

Referring to FIG. 8B, the processor 270 may receive front view image information in S810.

The processor 270 may generate an AR graphic object based on vehicle image information in S820.

The processor 270 may project the generated AR graphic object onto a screen in S830.

The processor 270 may acquire information on a first motion of the vehicle 100 in S840.

The information on the first motion of the vehicle 100 may be, for example, information on a motion of the vehicle 100 relative to a first coordinate system, or the information which is generated based on the front view image information.

The processor 270 may acquire information on a second motion in S845.

The information on the second motion of the vehicle 100 may be, for example, information on a motion of the vehicle 100 relative to a second coordinate system, or the information which is generated based on IMU sensing information.

The processor 270 may correct the information on the first motion based on the information on the second motion.

For example, the processor 270 may convert a first coordinate system, which is a reference of the information on the second motion, into a second coordinate system, which is a reference of the information on the first motion.

For example, the processor 270 may convert the scale of the information on the second motion into the scale of the information on the first motion.

The processor 270 may warp an AR graphic object based on corrected information on the first motion in S860.

For example, the processor 270 may control the display unit 251 based on corrected information on a first motion so as to change a location of an AR graphic projected onto the screen.

In some implementations, the processor 270 may warp an AR graphic object based on information on a second motion.

The processor 270 may project the warped graphic object onto the screen in S870.

Figure 9A:
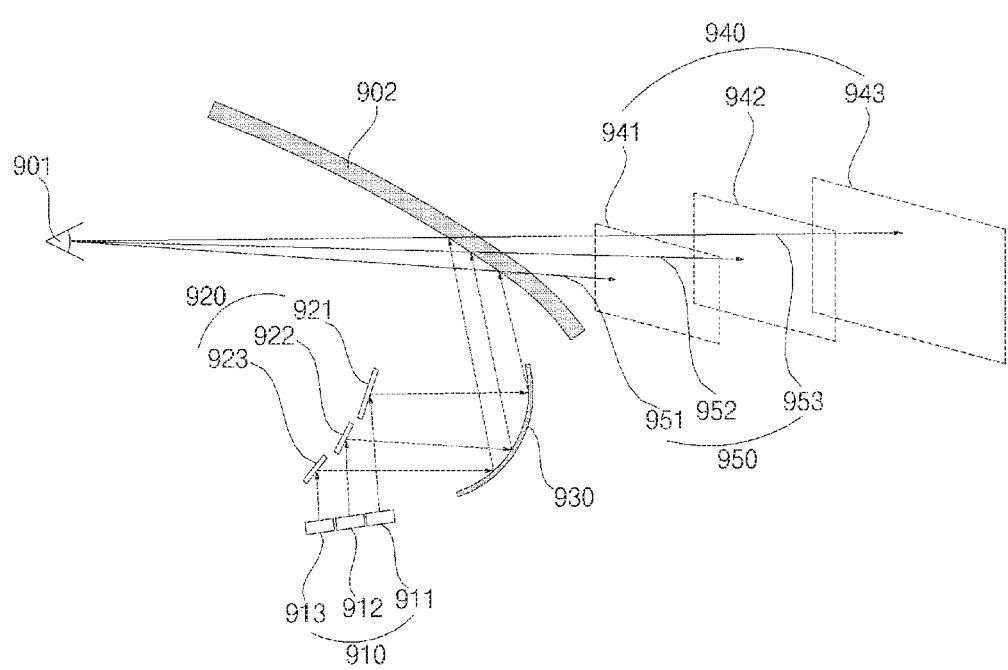
FIGS. 9A and 9B are diagrams illustrating an example configuration of a display unit according to an implementation of the present disclosure.
Figure 9B:
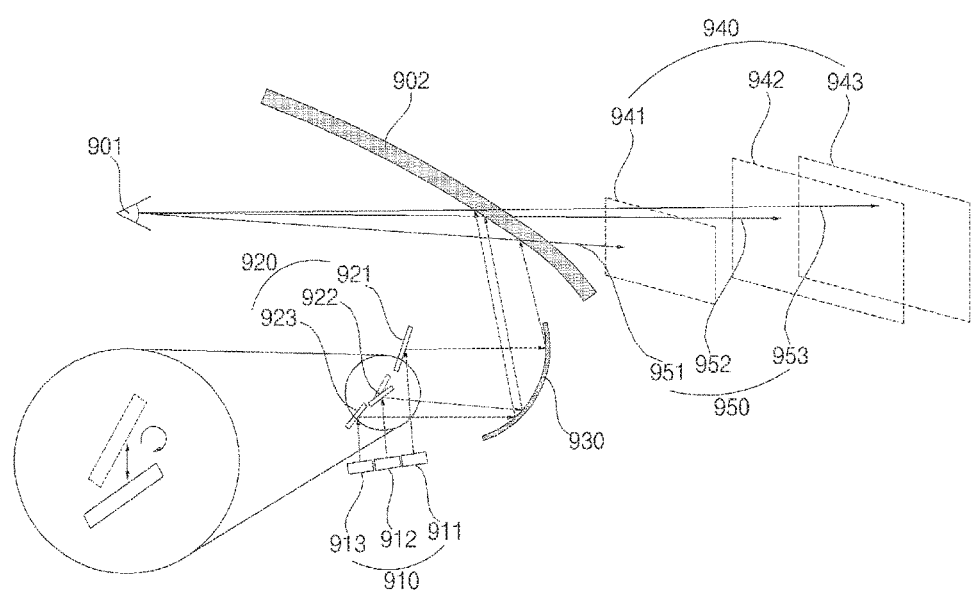

FIGS. 9A and 9B illustrate an example configuration of a display unit according to an implementation of the present disclosure.

Referring to the drawings, the display unit 251 may include an imaging unit 910, a flat mirror 920, and a concave mirror 930.

The imaging unit 910 may generate and output an image based on a control signal from the processor 270. The imaging unit 910 may project the generated image. The image generated by the imaging unit 910 may be projected into the flat mirror 920.

The imaging unit 910 may generate an AR graphic object and output the AR graphic object.

The imaging unit 910 may include one or more image output units. The imaging unit 910 may include a plurality of image output units 911, 912, and 913, the number of which corresponds to the number of multi-display layers.

For example, the imaging unit 910 may include a first image output unit 911, a second image output unit 912, and a third image output unit 913.

The drawings shows an example in which imaging unit 910 includes three image output units, but the imaging unit 910 may include one or two image output units. In another example, the imaging unit 910 may include four or more image output units.

The flat mirror 920 may reflect an image, generated and projected by the imaging unit 910, toward the concave mirror 930.

The flat mirror 920 may reflect an AR graphic object, generated and projected by the imaging unit 910, toward the concave mirror 930.

The flat mirror 920 may include one or more mirrors 921, 922, and 923. The flat mirror 920 may include a plurality of mirror 921, 922, and 923, the number of which corresponds to the number of multi-display layers.

For example, the flat mirror 920 may include a first mirror 921, a second mirror 922, and a third mirror 923.

The drawing shows an example in which the flat mirror 920 includes three mirrors, but the flat mirror 920 may include one or two mirrors. In another example, the flat mirror 920 may include four or more mirrors.

As illustrated in FIG. 9B, the flat mirror 920 may move to adjust an angle of reflection.

For example, the display unit 251 may further include a flat mirror drive unit. The flat mirror drive unit may include a motor, an actuator, or a solenoid.

The flat mirror drive unit may adjust the position of the flat mirror 920 based on a control signal from the processor 270.

A virtual distance may be changed based on adjustment of the position of the flat mirror 920. Specifically, as the position of the flat mirror 920 is adjusted, a location of a virtual image projected onto a windshield 902 may be changed. As the location of the virtual image projected onto the windshield 902 is changed, a virtual distance 950 of a display layer may be changed.

The processor 270 may control the flat mirror drive unit so that the position of the flat mirror 920 is adjusted to warp an AR graphic object.

For example, the processor 270 may control the flat mirror drive unit so that the position of the flat mirror 920 is adjusted to cause an AR graphic object to move on the screen.

The drawing shows an example in which the position of the second mirror 922 is adjusted, but even the positions of the first mirror 921 and the third mirror 923 may be adjusted.

The concave mirror 930 may reflect an image, reflected by the flat mirror 920, toward the screen 902.

The concave mirror 930 may reflect again an AR graphic object, reflected by the flat mirror 920, toward the screen 902 (for example, a windshield).

In this case, the image reflected by the concave mirror 930 may be projected onto the windshield 902. The image projected onto the windshield 902 is a virtual image. In some implementations, the image reflected by the concave mirror 930 may be projected onto a combiner.

A user 901 may recognize an image projected onto the windshield 902 as being located ahead of the windshield 902.

A virtual image may be formed in one region of a virtual plane located ahead of the windshield 902. A display layer 940 may be defined as one region of the virtual plane on which the virtual image is formed. In this case, a virtual distance 950 may be defined as a distance from the user's eye 901 to the display layer 940.

The virtual distance 950 may be changed based on adjustment of position of the flat mirror 920. For example, when the virtual distance 950 has a first value and the flat mirror 920 is in a first position, the processor 270 may control the flat mirror drive unit to adjust the position of the flat mirror to a second position. In this case, a virtual distance 920 may have a second value.

The display layer 940 may be a single layer.

Alternatively, the display layer 940 may be multi-display layers 940.

The multi-display layers 940 may include a first display layer 941, a second display layer 942, and a third display layer 943.

An image generated by the first image output unit 911 is reflected by the first mirror 921, reflected again from the concave mirror 930, and then projected onto the windshield 902. The image projected onto the wind shield 902 may be realized as a virtual image formed on the first display layer. In this case, the first display layer 941 may have a first virtual distance 951.

An image generated by the second image output unit 912 is reflected by the second mirror 922, reflected again from the concave mirror 930, and then projected onto the windshield 902. The image projected onto the windshield 902 may be realized as a virtual image formed on the second display layer 942. In this case, the second display layer 942 may have a second virtual distance 952.

An image generated by the third image output unit 913 is reflected by the third mirror 923, reflected again from the concave mirror 930, and then projected onto the windshield 902. The image projected onto the windshield 902 may be realized as a virtual image formed on the third display layer 943. In this case, the third display layer 943 may have a third virtual distance 953.

Figure 10:
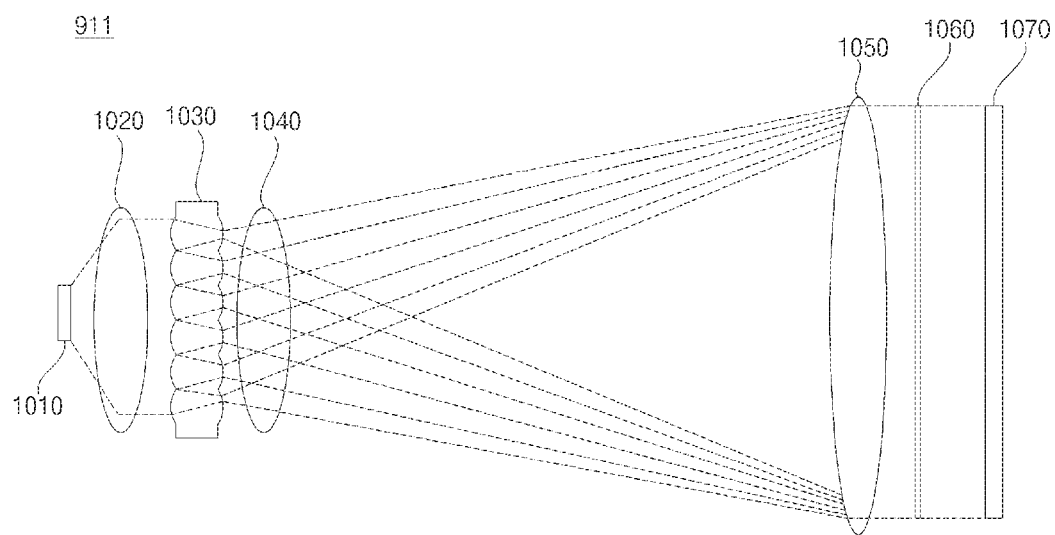
FIG. 10 is a diagram illustrating an operation of an image output unit according to an implementation of the present disclosure.

FIG. 10 illustrates an operation of an image output unit according to an implementation of the present disclosure.

Referring to FIG. 10, the first image output unit 911 will be mainly described. It is understood that the second image output unit 912 and the third image output unit 913 have the same configuration as that of the first image output unit 911 described with reference to FIG. 10.

The first image output unit 911 may include a backlight unit 1010, a collimation lens 1020, an illumination lens 1040 and 1050, a Fly Eye Lens (FEL) 1030, an imaging panel 1060, and a variable focal lens 1070.

The backlight unit 1010 may include one or more light source. For example, the backlight unit 1010 may include one or more Light Emitting Diodes (LEDs).

The backlight unit 1010 may output white light.

The collimation lens 1020 may be disposed between the backlight unit 1010 and the FEL 1030.

The collimation lens 1020 may cause lights output from the backlight unit 1010 to travel in parallel. The lights passing through the collimation lens 1020 may be distributed irregularly.

The illumination lens 1040 and 1050 may focus the lights passing through the FEL 1030 at the imaging panel 1050.

The illumination lens 1040 and 1050 may include a first illumination lens 1040 and a second illumination lens 1050.

The first illumination lens 1040 may focus lights, distributed after passing through the FEL 1030, at the second illumination lens 1050.

The second illumination lens 1050 may focus lights, passing through the first illumination lens 1040 and having different incident angles, at the imaging panel 1060.

The FEL 1030 may convert irregularly distributed lights into regularly distributed lights.

The FEL 1030 may include a plurality of cells. The FEL 1030 may expand lights, which are to be provided from the backlight unit 1010 to at least some of the cells, to a predetermined size, so that uniform lights may be provided to the imaging panel 1060.

The FEL 1030 may be disposed between the collimation lens 1020 and the imaging panel 1060.

The imaging panel 1060 may form an image based on lights provided from the backlight unit 1010. For example, the imaging panel 1060 may include a Liquid Crystal Display (LCD) panel.

The variable focal lens 1070 may vary a focal distance based on a control signal from the processor 270.

The variable focal lens 1070 may include liquid crystals. According to arrangement of the liquid crystals, the variable focal lens 1070 may change a location at which a virtual image is to be formed based on a generated image.

The processor 270 may control the variable focal lens 1070 to vary the virtual distance 950 of the display payer 940.

Figure 11:
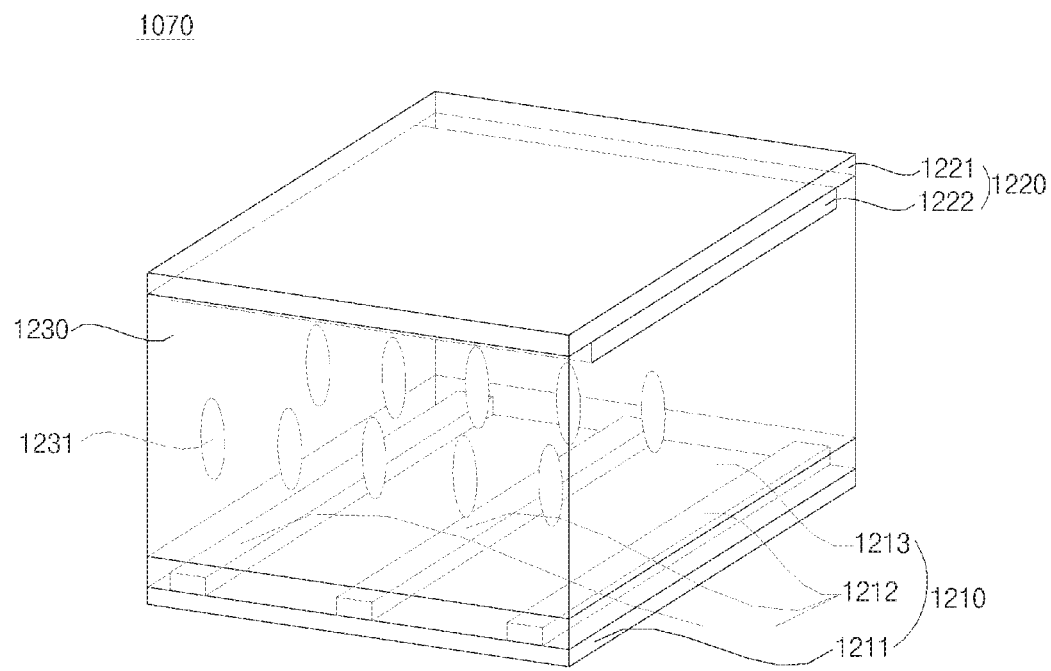
FIG. 11 is a diagram illustrating an operation of a variable focal lens according to an implementation of the present disclosure.

FIG. 11 illustrates an operation of a variable focal lens according to an implementation of the present disclosure.

The variable focal lens 1070 may include a first substrate 1210, a second substrate 1220, and a liquid crystal layer 1230.

The first substrate 1210 may include a first base substrate 1211, a plurality of first electrodes 1212, and an insulating layer 1213.

The plurality of first electrodes 1212 may be formed on the first base substrate 1211. The plurality of first electrodes 1212 are spaced apart a predetermined distance. Under the control of the processor 270, a voltage may be applied to the plurality of first electrodes 1212. For example, under the control of the processor 270, a voltage at a different level may be applied to each of the first electrodes 1212.

In some implementations, the plurality of first electrodes 1212 may be transparent electrodes. For example, the plurality of first electrodes 1212 may be Indium Tin Oxide (ITO) transparent electrodes. As the first electrodes 1212 are formed as transparent electrodes, they may not block vision.

The insulating layer 1213 may be formed on the first base substrate 1211 to cover the plurality of first electrodes 1212.

The second substrate 1220 may be disposed to face the first substrate 1210. The second substrate 1220 may include a second base substrate 1221 and a second electrode 1222.

The second electrode 1222 may be formed on the second base substrate 1221. The second electrode 1222 may be disposed to face the plurality of first electrodes 1212. Under control of the processor, a voltage may be applied to the second electrode 1222. Under control of the processor 270, a voltage at a constant level may be applied to the second electrode 1222.

In some implementations, the second electrode 1222 may be a transparent electrode. For example, the second electrode 1222 may be an ITO transparent electrode. As the second electrode 1222 is formed as a transparent electrode, it may not block vision.

The liquid crystal layer 1230 may be disposed between the first substrate 1210 and the second substrate 1220. The liquid crystal layer 1231 may include a plurality of liquid crystal molecules 1231. The plurality of liquid crystal molecules 1231 may be driven so as to form a predetermined angle from a horizontal direction to a vertical direction to correspond to the size of a provided voltage. As the plurality of liquid crystal molecules 1231 have the predetermined angle in accordance with control of the processor 270, a focal point of the variable focal lens 1070 may be changed.

The variable focal lens 1070 may further include a first transparent plate and a second transparent plate. The first transparent plate may be disposed external to the first substrate 1210. The second transparent plate may be disposed external to the second substrate 1220. A transparent plate may refer to glass.

Figure 12:
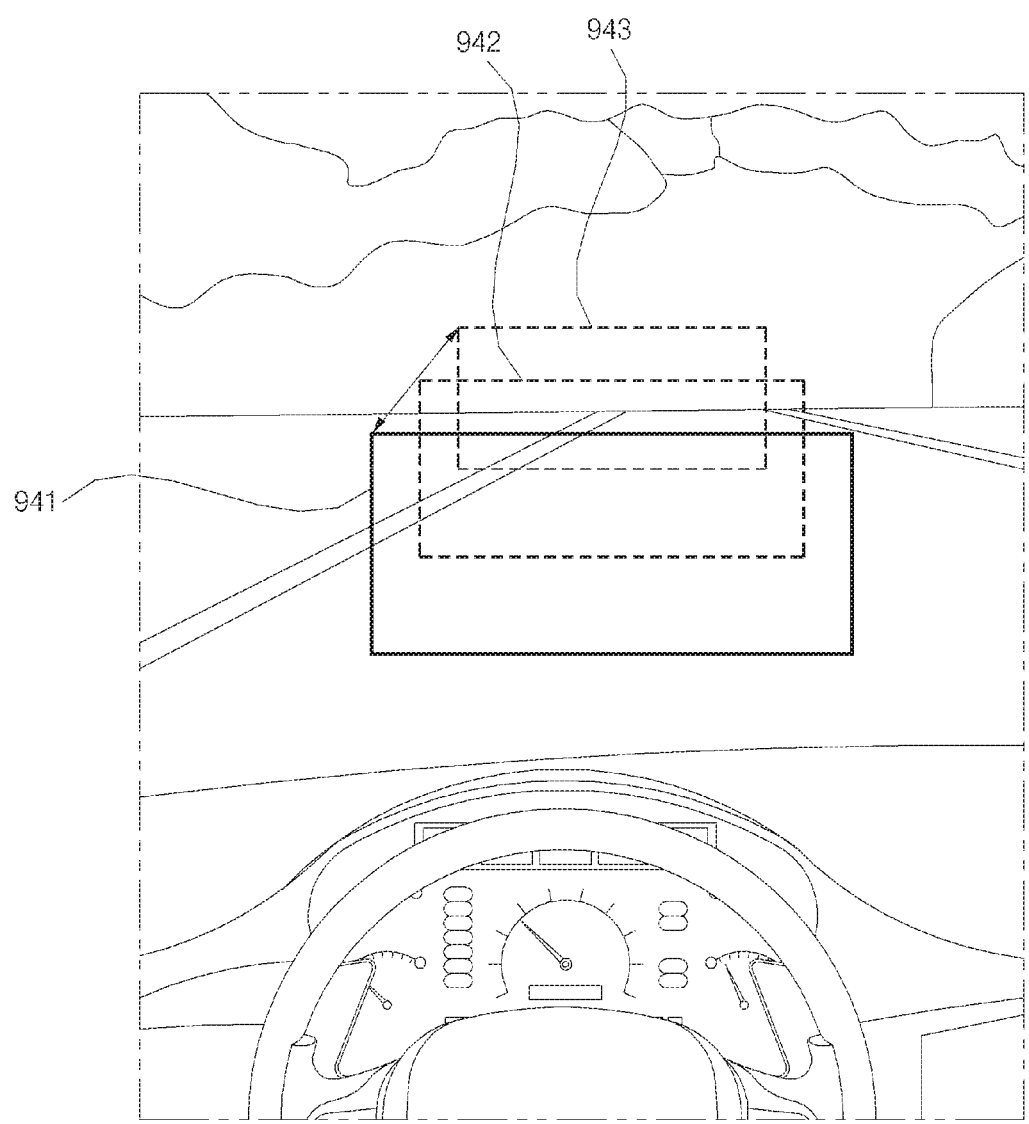
FIG. 12 is a diagram illustrating an operation of a user interface apparatus for a vehicle as seen in a forward direction from a driver's seat, according to an implementation of the present disclosure.

FIG. 12 illustrates an operation of a user interface apparatus for a vehicle, as seen forward from a driver's seat, according to an implementation of the present disclosure.

Referring to FIG. 12, the display unit 251 may implement multi-display layers 941, 942, and 943.

The display unit 251 may implement a first display layer 941, a second display layer 942, and a third display layer 943.

The first display layer 941 may have a first virtual distance.

The second display layer 942 may have a second virtual distance. The second virtual distance may be longer than a third virtual distance.

The third display layer 943 may have a third virtual distance. The third virtual distance may be longer than the second virtual distance.

The processor 270 may adjust a virtual distance of each of the multi-display layers 941, 942, and 943 individually based on driving situation information.

The processor 270 may display an AR graphic object on the multi-display layers 941, 942, and 943.

The AR graphic object may be based on driving situation information. In another example, the AR graphic object may be based on data stored in the memory 240. In yet another example, the AR graphic object may be based on data that is received from an external device through the communication apparatus 400 and the interface unit 245.

The processor 270 may control the display unit 251 to display a different AR graphic object on each of the multi-display layers 941, 942, and 943.

The processor 270 may control the display unit 251 to display a first AR graphic object on the first display layer 941.

The processor 270 may control the display unit 251 to display a second graphic object on the second display layer 942.

The processor 270 may control the display unit 251 to display a third AR graphic object on the third display layer 943.

The processor 270 may control the display unit 251 to display make two or more of the first, second, and third AR graphic objects in an overlapping manner.

Each of the multi-display layers 941, 942, and 943 may have a virtual distance variable range.

For example, the first display layer 941 may have a virtual distance between a first distance value and a second distance value.

For example the second display layer 942 may have a virtual distance between the second distance value and a third distance value.

For example, the third display layer 943 may have a virtual distance between the third distance value and a fourth distance value.

The processor 270 may control the display unit 251, so that the same AR graphic object is displayed on the multi-display layers 941, 942, and 942 at time intervals.

The processor 270 may control the display unit 251 to display a first AR graphic object on the third display layer 941 for a first period of time. In this case, the processor 270 may change a virtual distance of the third display layer 943 on which the first AR graphic object is being displayed.

The processor 270 may control the display unit 251 to display a first AR graphic object on the second display layer for a second period of time. The second period of time may be a period of time continuous with the first period of time. In this case, the processor 270 may change a virtual distance of the second display layer 942 on which the first AR graphic object is being displayed.

The processor 270 may control the display unit 251 to display the first AR graphic object on the first display layer 941 for a third period of time. The third period of time may be a period of time continuous with the second period of time. In this case, the processor 270 may perform a control action to change a virtual distance of the first display layer 941 on which the first AR graphic object is being displayed.

By doing so, it is possible to cause the first AR graphic object to gradually move close to a user within the range of between the first distance value and the fourth distance value over the first period of time to the third period of time. Accordingly, it may produce more realistic depth/spatial perception of a user.

Figure 13A:
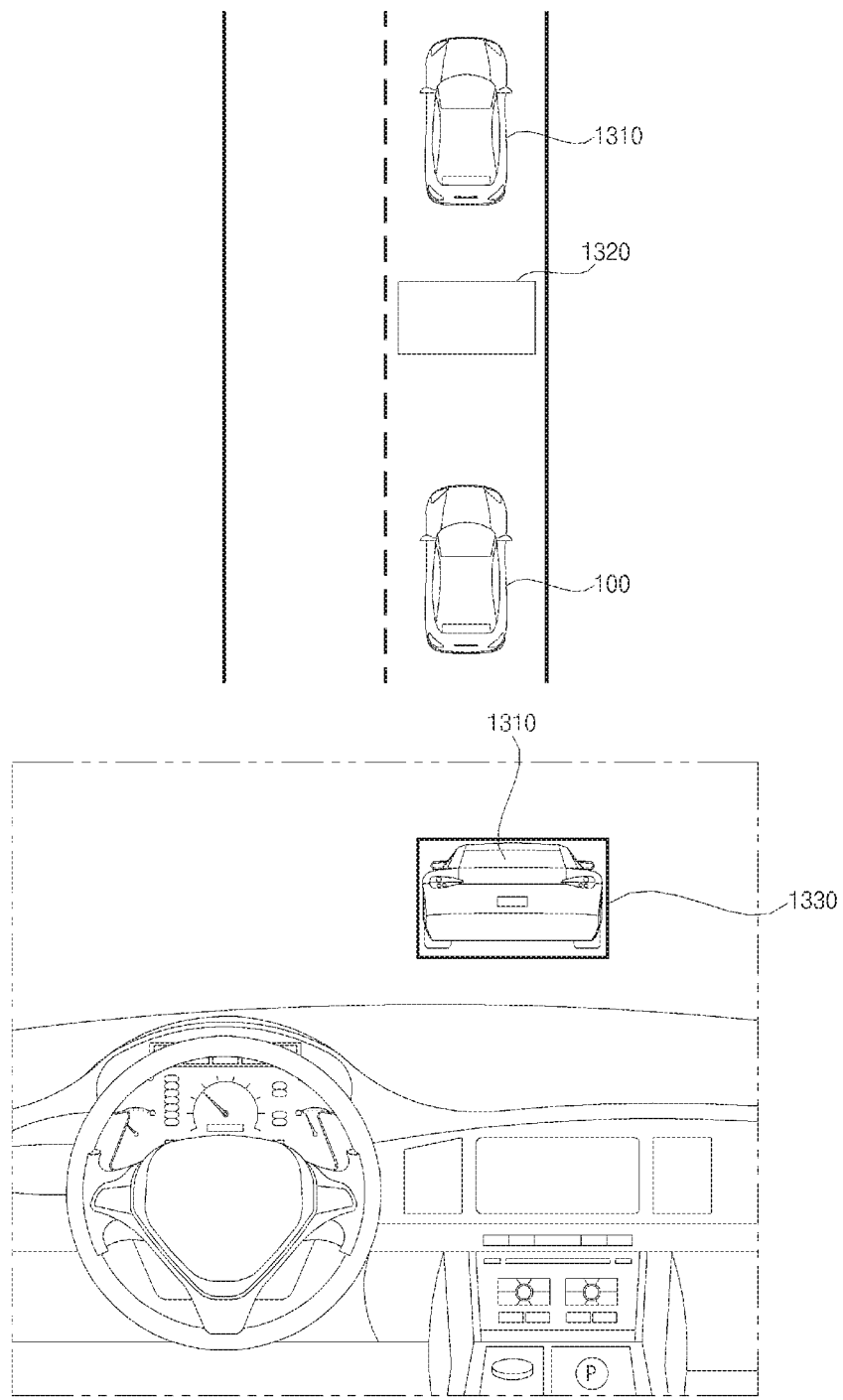
FIGS. 13A to 13C are diagrams illustrating an operation of a user interface apparatus for a vehicle when a vehicle passes over a bump, according to an implementation of the preset disclosure.
Figure 13B:
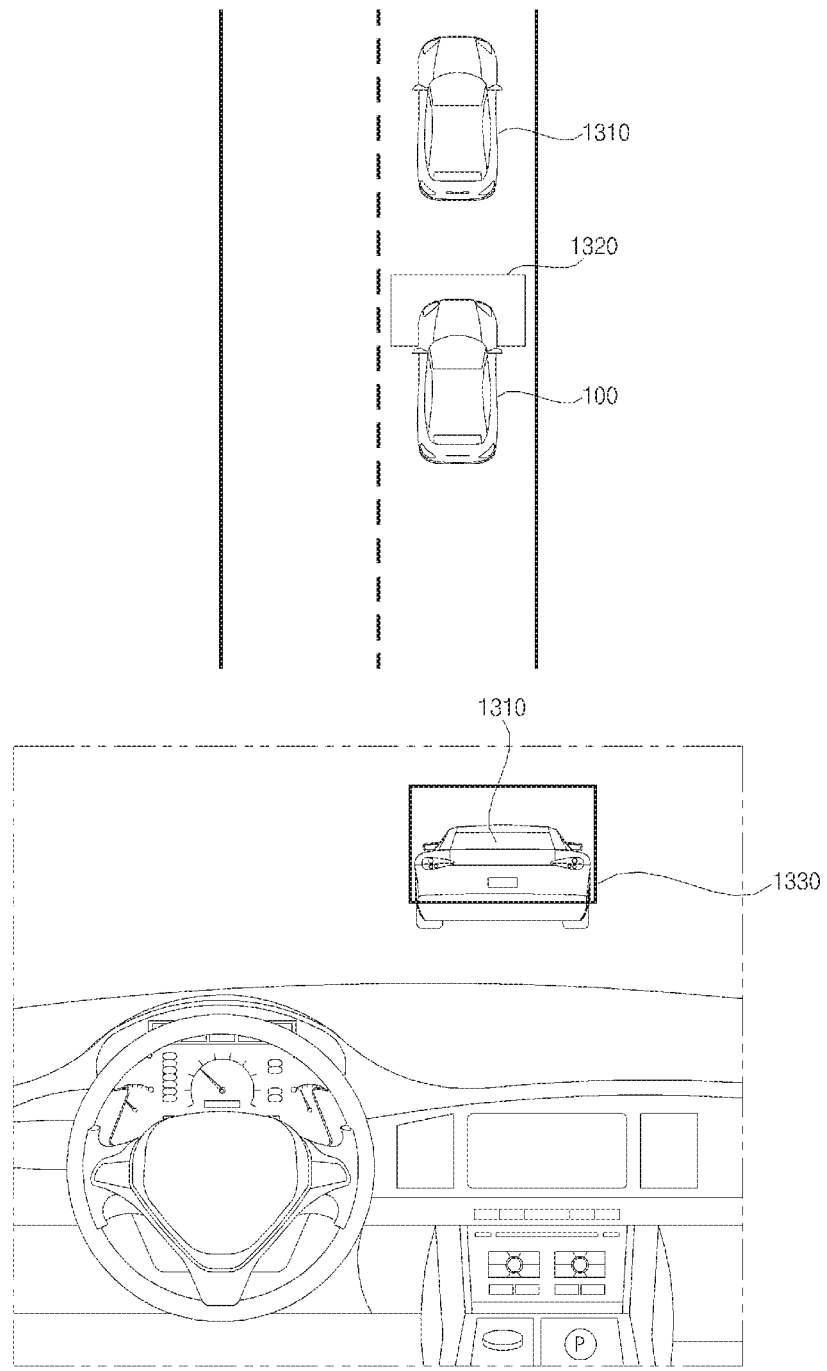
Figure 13C:
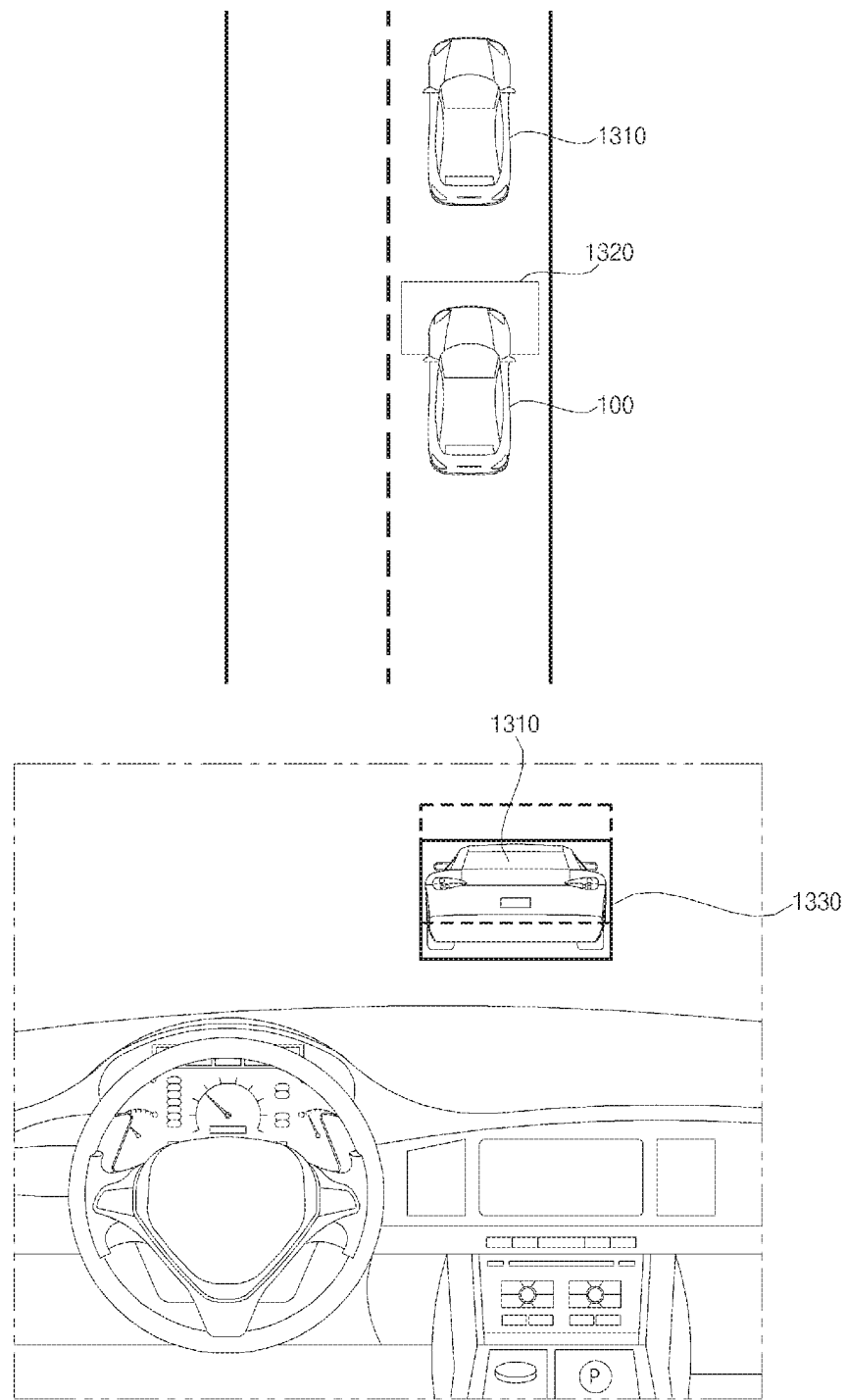

FIGS. 13A to 13C illustrate operations of a user interface apparatus in various situations according to an implementation of the present disclosure.

Referring to the drawings, the processor 270 may receive front view image information from the camera 310.

The processor 270 may acquire information on a first object 1310 from the object detection apparatus 300.

The information on the first object 1310 may include information on the presence of the first object 1310, information on a location of the first object 1310, information on a distance between the vehicle 100 and the first object 1310, and information on a speed of movement of the vehicle 100 relative to the first object 1310.

Based on the front view image of the processor 270, the processor 270 may generate an AR graphic object 1330 corresponding to the first object 1310.

The processor 270 may project the AR graphic object 1330 onto a windshield so that the AR graphic object 1330 is displayed overlapping with the object 1310 or is displayed in the surroundings of the object 1310.

The first object 1310 may be an object o described above with reference to FIGS. 5 and 6.

The first object 1310 may be a stationary object or a moving object.

For example, the first object may be a nearby vehicle on the move or a pedestrian on the move.

For example, the first object may be a traffic signal, a road, a structure, a stopped nearby vehicle, or a stopped pedestrian.

The processor 270 may acquire information on a second object 1320, 1420, 1520, or 1620 from the object detection apparatus 300.

The second object 1320 may be an object that induces the vehicle 100 to move.

The second object 1320 may be an obstacle in a bump, a hole, a curve, a slope, or a road surface.

FIGS. 13A to 13C are diagrams illustrating operation of a user interface apparatus for a vehicle when the vehicle passes a bump according to an implementation of the preset disclosure.

The vehicle 100 may pass over a bump 1320.

The bump 1320 may include a speed bump.

As illustrated in FIG. 13A, the processor 270 may receive information on the bump 1320 from the object detection apparatus 300 as information on a second object.

The information on the bump 1320 may include information on a location of the bump, information on a height of the bump, information on a length of the bump, information on a width of the bump, information on a distance between the vehicle 100 and a bump, and timing information on when the vehicle 100 is expected to encounter the bump.

As illustrated in FIG. 13B, when the front wheels of the vehicle 100 hit the bump 1320, the front end of the vehicle 100 is raised.

In this case, the first object 1310 appears to move downward from the perspective of the user.

In this case, unless a location of an AR graphic object 1330 projected onto a screen is adjusted accordingly, the AR graphic object 1330 does not match with the first object 1310.

As illustrated in FIG. 13C, the processor 270 may match the AR graphic object 1330 with the first object 1310 by warping the AR graphic object 1330.

The processor 270 may acquire vehicle motion information.

The vehicle motion information may include information on occurrence of movement of the vehicle 100, information on a displacement of movement of the vehicle 100, information on a direction of movement of the vehicle 100, information on a speed of movement of the vehicle 100, information on a position of the vehicle 100.

The processor 270 may acquire information on a first motion of the vehicle 100 relative to the world coordinate system, the information which may be generated based on front view image information.

The processor 270 may acquire information on a second motion relative to the local coordinate system, the information which may be generated based on sensing information of the IMU sensor.

The processor 270 may correct the information on the first motion based on the information on the second motion.

The processor 270 may warp an AR graphic object based on the corrected information on the first motion.

In some implementations, the processor 270 may warp an AR graphic object based on the information on the second motion.

As previously described, the information on the first motion may be acquired more slowly relative to the information on the second motion.

If an AR graphic is warped only based on uncorrected information on a first motion, movement of the AR graphic object is delayed. In this case, a user may see a moved AR graphic object after the vehicle 100 passes a second object 1320, 1420, 1520, or 1620.

If an AR graphic object is warped based on corrected information on a first motion or information on a second motion, movement of the AR graphic object may be delayed by a negligible. In this case, a user may see the AR graphic 1330 as matching with the first object 1310 even when the vehicle 100 is passing the second object 1320, 1420, 1520, or 1620.

Figure 14A:
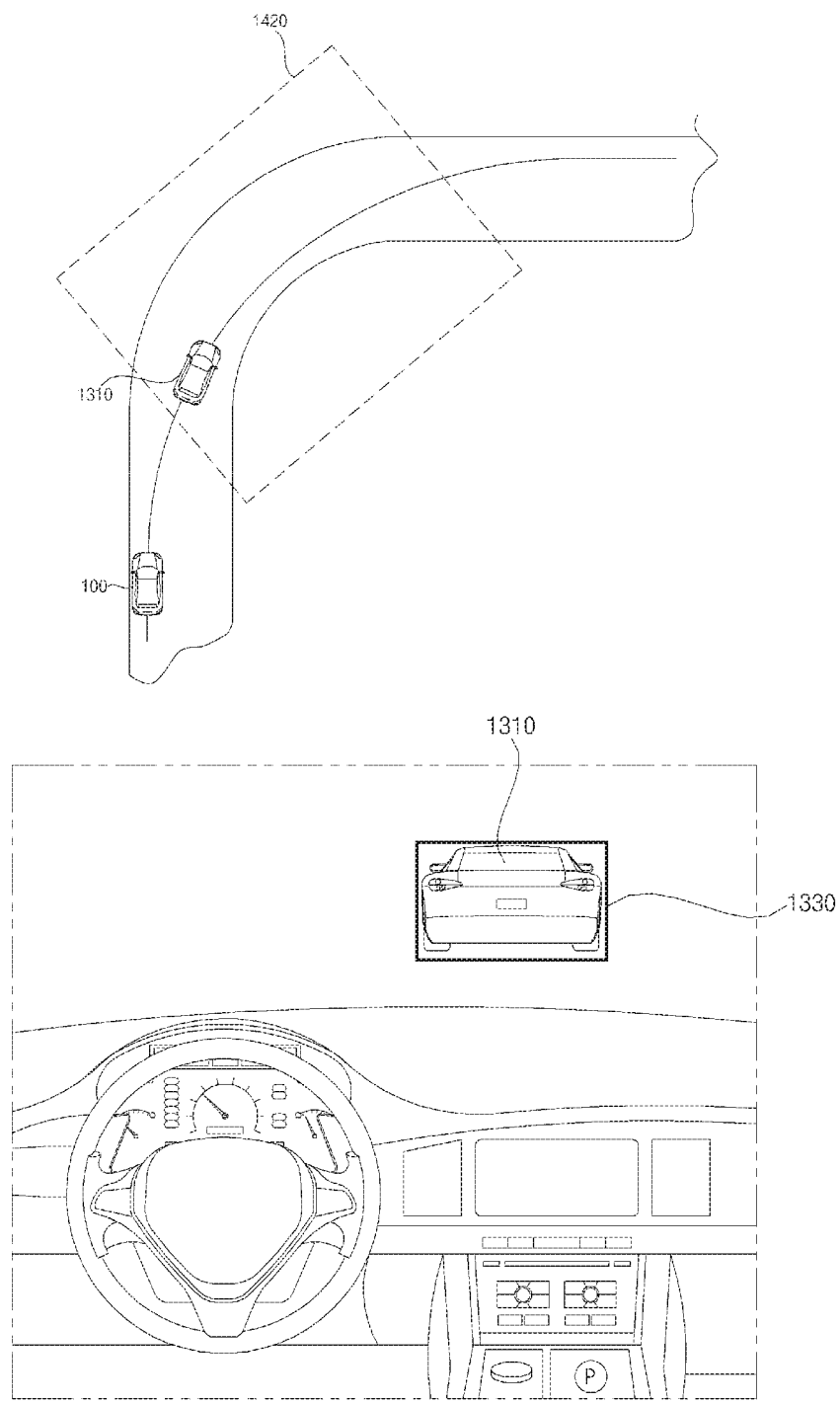
FIGS. 14A to 14C are diagrams illustrating an operation of a user interface apparatus for a vehicle when a vehicle enters a curve section, according to an implementation of the present disclosure.
Figure 14B:
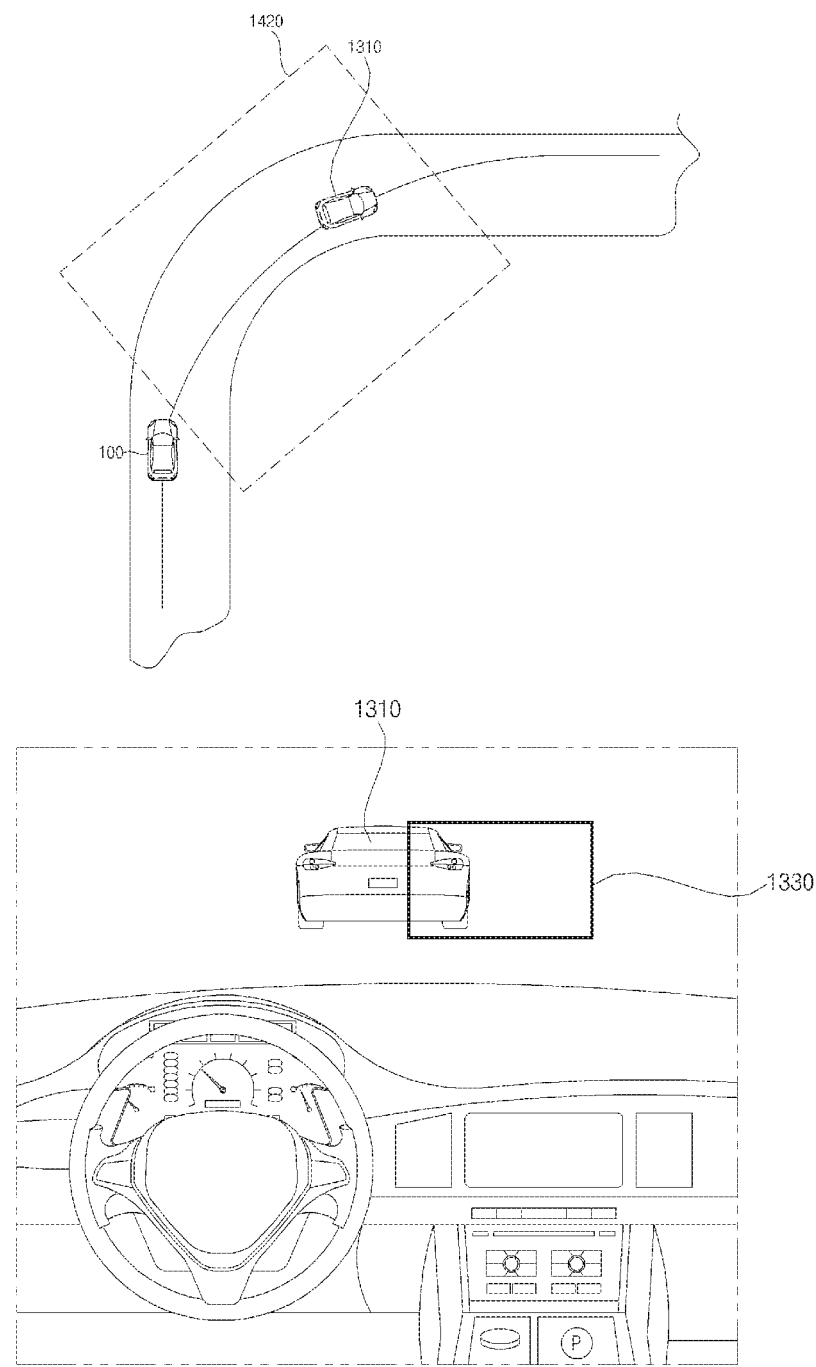
Figure 14C:
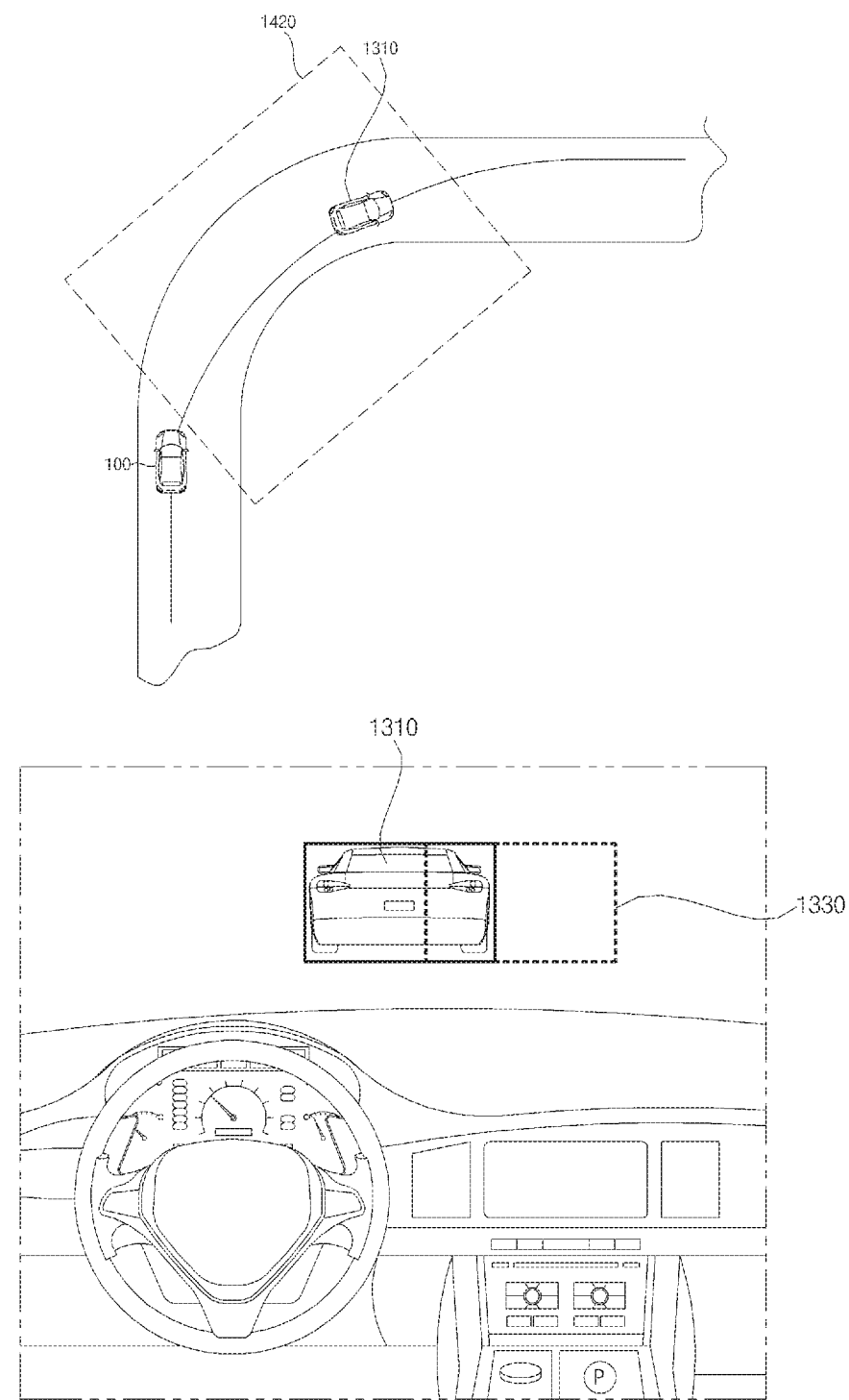

FIGS. 14A to 14C illustrate an operation of a user interface apparatus for a vehicle when the vehicle enters a curve section according to an implementation of the present disclosure.

The vehicle 100 may enter a curve section 1420.

As illustrated in FIG. 14A, the processor 270 may receive information on the curve section 1420 from the object detection apparatus 300 or the navigation system 770 as information on a second object.

The information on the curve section 1420 may include curvature information of the curve section 1420, information on a distance between the vehicle 100 and the curve section 1420, and timing information on when the vehicle 100 is expected to enter the curve section 1420.

As illustrated in FIG. 14B, when steering input is made, the vehicle 100 may be directed toward a direction of the steering.

For example, as illustrated in the drawing, when the vehicle 100 is steered toward the right side in a forward direction of travel of the vehicle 100, the vehicle 100 may be directed to the right.

For example, if the vehicle 100 is steered toward the left side in a forward direction of travel of the vehicle 100, the vehicle 100 may be directed to the left.

In this case, the first object 1310 may relatively move in a direction which is opposite to a direction of steering from the perspective of a user.

In this case, unless a location of the AR graphic object 1330 projected onto a screen is not adjusted, the AR graphic object 1330 and the first object 1310 do not match with each other.

For example, if a curvature of the curve is equal to or greater than a reference value, the AR graphic object 1330 and the first object 1310 may be considered to not match with each other.

For example, if a degree of steering per unit time is equal to or greater than a reference value, the AR graphic object 1330 and the first object 1310 may be considered to not match with each other.

As illustrated in FIG. 14C, the processor 270 may match the AR graphic object 1330 with the first object 1310 by warping the AR graphic object 1330.

Warping the AR graphic object 1330 is the same as described with reference to FIG. 13C.

Figure 15A:
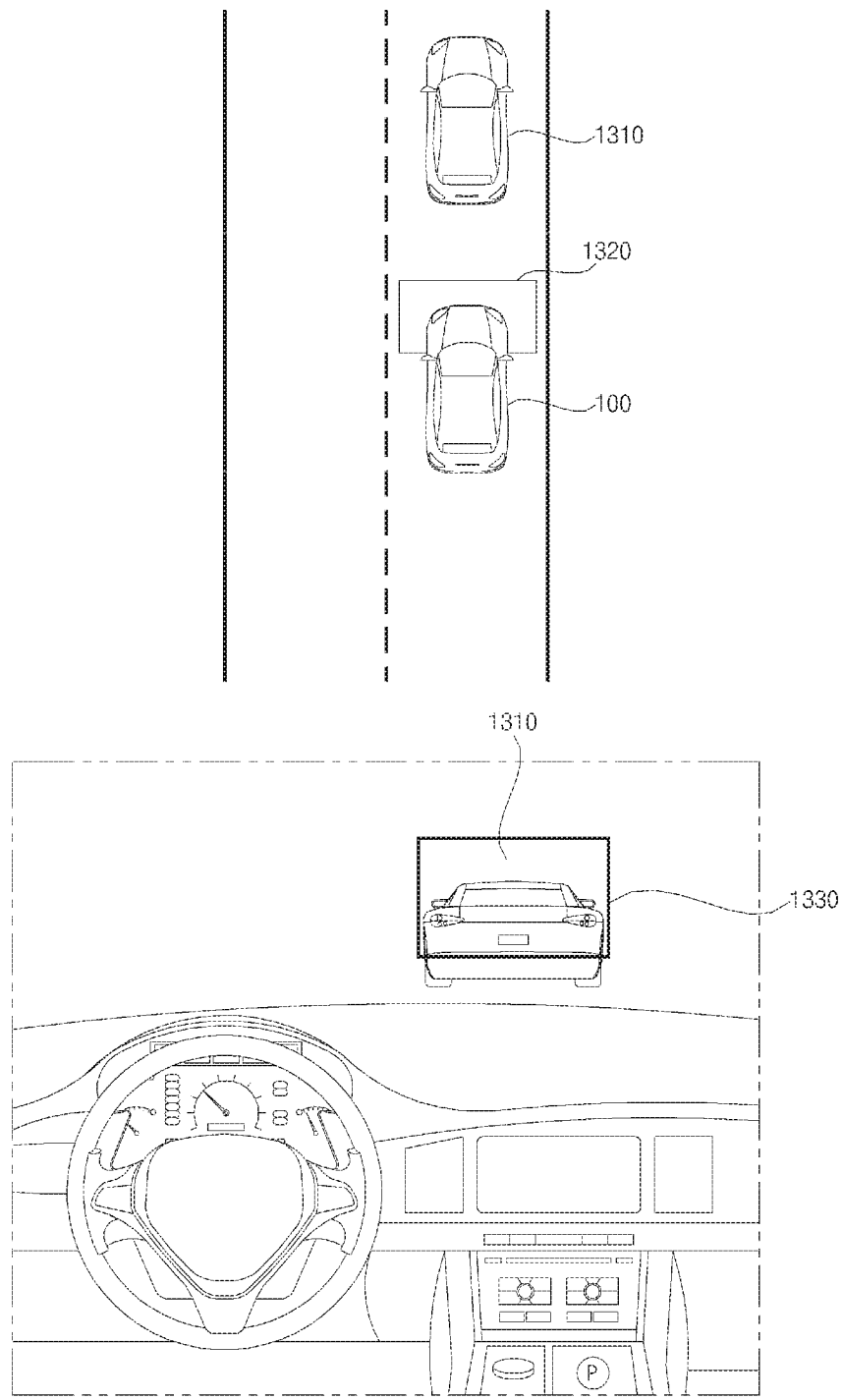
FIGS. 15A to 15C are diagrams illustrating warping of an AR graphic object according to an implementation of the present disclosure.
Figure 15B:
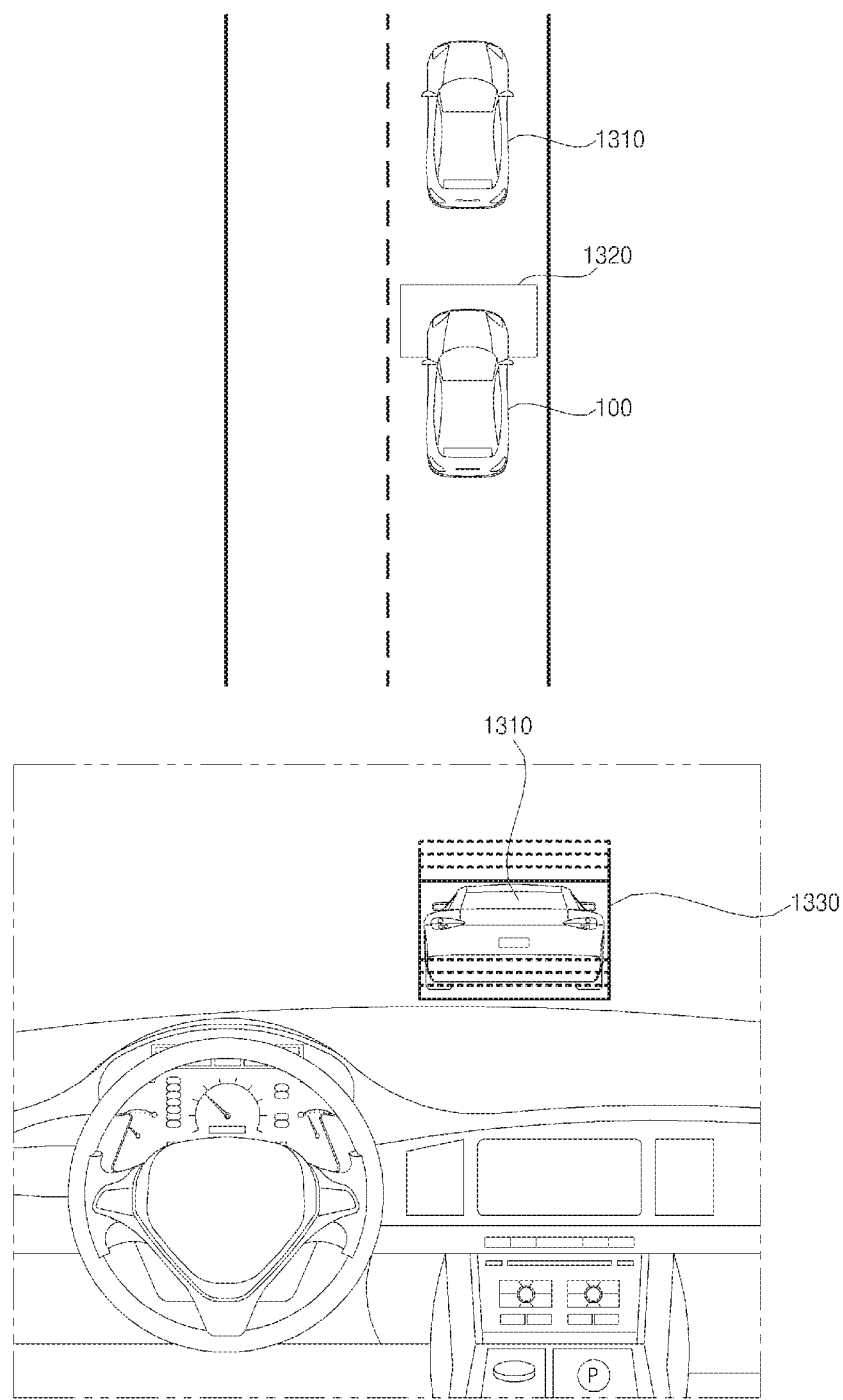
Figure 15C:
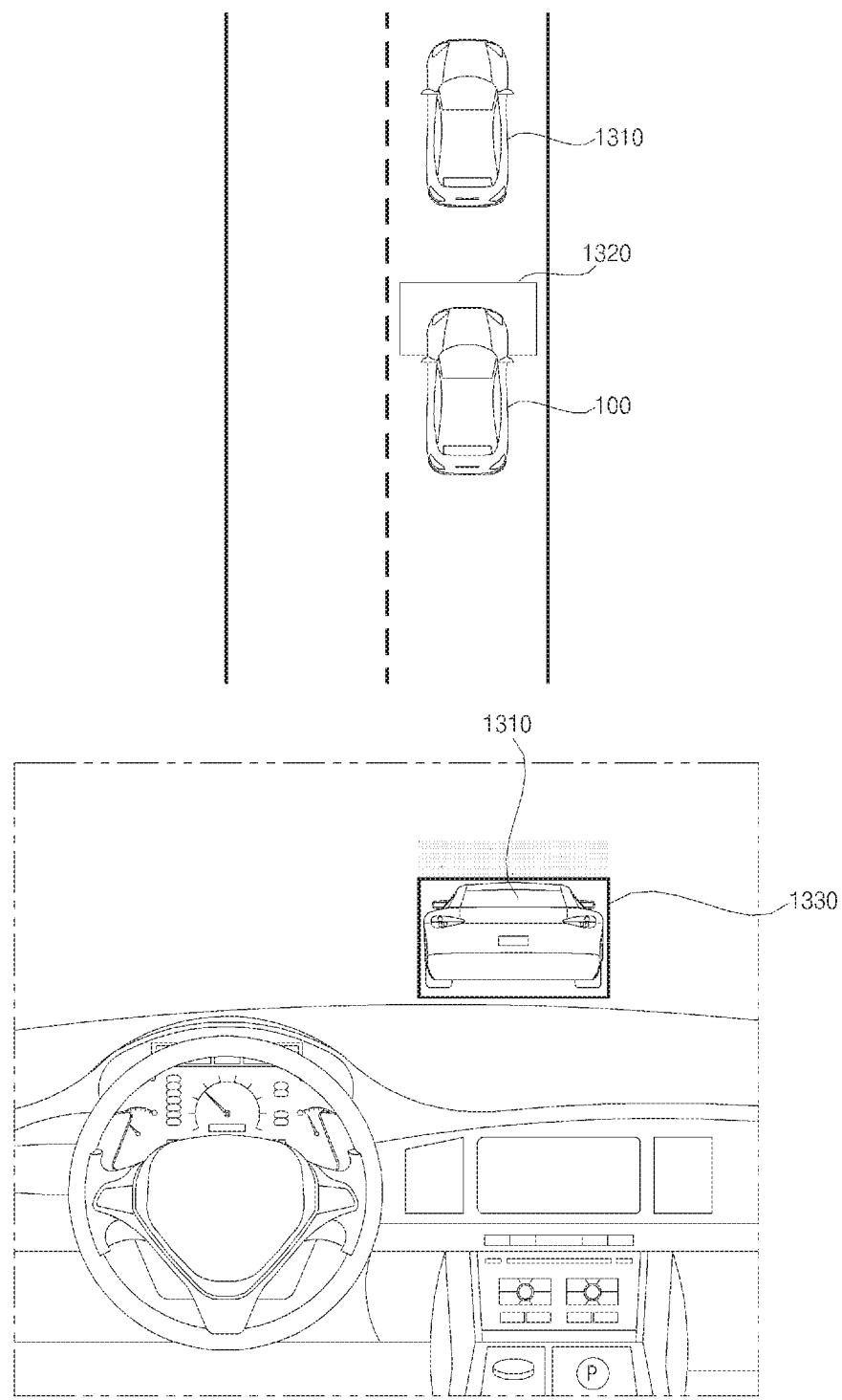

FIGS. 15A to 15C illustrate warping of an AR graphic object according to an implementation of the present disclosure.

Referring to the drawings, the processor 270 may generate an AR graphic object corresponding to a first object 1310 based on front view image information.

The processor 270 may project the AR graphic object 1330 onto a screen so that the AR graphic object 1330 matches with the first object 1310 from the perspective of a user.

In this case, based on information on the user's eyes detected from an image of the inside of the vehicle 100 acquired by the internal camera 220, the processor 270 may determine a region in the screen where to project the AR graphic object 1330.

As illustrated in FIG. 15A, movement of the vehicle 100 may occur when the vehicle 100 passes a bump. In this case, as illustrated in FIG. 15B or 15C, the processor 270 may warp an AR graphic object based on vehicle motion information.

The vehicle motion information may be generated based on front view image information or sensing information of the IMU sensor.

The processor 270 may control the display unit 251 based on the vehicle motion information to change a location of the AR graphic object 1330 projected onto the screen.

The processor 270 may control the display unit 251, so that a location of the AR graphic object 1330 is changed in a direction which is opposite to a direction of movement of the vehicle 100 determined based on the vehicle motion information.

The processor 270 may control the display unit 251, so that a location of the AR graphic object 1330 is changed in proportion to a displacement of movement of the vehicle 100 determined based on the vehicle motion information.

The processor 270 may control the display unit 251, so that a location of the AR graphic object 1330 is changed in proportion to a speed of movement of the vehicle 100 determined based on the vehicle motion information.

For example, when the front end of the vehicle 100 is raised from the ground surface as the front wheels of the vehicle 100 hits a bump 1320, pitch change may occur. Information on the pitch change may be acquired as vehicle motion information.

The processor 270 may control the display unit 251, so that a location of the AR graphic object 1330 is changed in a direction which is opposite to a direction of the pitch change of the vehicle 100.

The processor 270 may control the display unit 251, so that the AR graphic object moves by a displacement proportional to a displacement of the pitch change of the vehicle 100.

The processor 270 may control the display unit 251, so that the AR graphic object 1330 moves at a speed proportional to a speed of the pitch change of the vehicle 100.

As illustrated in FIG. 15B or 15C, the processor 270 may control the display unit 251, so that the AR graphic object 1330 moves on the screen in a direction downward from the ground surface, by a displacement proportional to a displacement of pitch change of the vehicle 100, and at a speed proportional to a speed of the pitch change of the vehicle 100.

When warping the AR graphic object 1330, the processor 270 may add graphic effect to the AR graphic object 1330.

For example, as illustrated in FIG. 15B, when warping the AR graphic object 1330, the processor 270 may add fade-out effect to the AR graphic object 1330.

The processor 270 may control the display unit 251 so that, while moving, the AR graphic object 1330 is gradually blurred in a region where the AR graphic object 1330 was displayed.

For example, as illustrated in FIG. 15C, when warping the AR graphic object 1330, the processor 270 may add blur effect to the AR graphic object 1330.

The processor 270 may control the display unit 251, so that, while the AR graphic object 1330 moves, an after image of the AR graphic object 1330 is gradually blurred in a region where the AR graphic object 1330 was displayed. The processor 270 may control the display unit 251, so that the blurred after image becomes transparent to disappear after a specific period of time elapses.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A user interface apparatus for a vehicle comprising:
   an interface electrically connected to (i) a first camera of the vehicle configured to acquire front view image information and (ii) an Inertial Measurement Unit (IMU) of the vehicle configured to acquire vehicle motion sensing information;
a display configured to project an augmented reality (AR) graphic object onto a screen of the vehicle;
at least one processor; and
a computer-readable medium coupled to the at least one processor having stored thereon instructions which, when executed by the at least one processor, causes the at least one processor to perform operations comprising:
acquiring, through the interface, the front view image information from the first camera;
based on the front view image information, generating the AR graphic object;
acquiring, through the interface, the vehicle motion sensing information from the IMU; and
based on the vehicle motion sensing information, warping the AR graphic object,
wherein warping the AR graphic object comprises changing, through the display, a location of the AR graphic object projected onto the screen based on the vehicle motion sensing information.

2. The user interface apparatus according to claim 1, wherein the operations further comprise:
based on the vehicle motion sensing information, generating second motion information associated with a second motion of the vehicle, the second motion information being defined with respect to a second coordinate system,
wherein changing the location of the AR graphic object further comprises changing, through the display, the location of the AR graphic object projected onto the screen based on the second motion information.

3. The user interface apparatus according to claim 2, wherein changing the location of the AR graphic object projected onto the screen based on the second motion information comprises:
based on the second motion information, determining a second motion direction of the vehicle; and
changing the location of the AR graphic object in a direction opposite to the second motion direction of the vehicle.

4. The user interface apparatus according to claim 2, wherein changing the location of the AR graphic object projected onto the screen based on the second motion information comprises:
based on the second motion information, determining a second displacement magnitude of the vehicle; and
changing the location of the AR graphic object in correspondence to the determined second displacement magnitude of the vehicle.

5. The user interface apparatus according to claim 1, wherein the operations comprise:
based on the vehicle motion information, determining a change in a motion of the vehicle; and
based on the determination of the change in the motion of the vehicle, adding a graphical effect to the AR graphic objects.

6. The user interface apparatus according to claim 5, wherein the graphical effect comprises one or more of fade out effect or blur effect.

7. The user interface apparatus according to claim 1, wherein the operations comprise:
acquiring, through the interface unit, vehicle pitch information associated with a change in a pitch of the vehicle; and
warping the AR graphic object based on the vehicle pitch information.

8. The user interface apparatus according to claim 1, wherein the operations comprise:
acquiring, through the interface unit, vehicle yaw information associated with a change in yaw of the vehicle which is generated when a steering wheel is rotated; and
warping the AR graphic object based on the vehicle yaw information.

9. The user interface apparatus according to claim 1, further comprising a second camera configured to capture images of eyes of a user of the vehicle,
wherein the operations comprise:
based on the captured images, detecting the eyes of the user;
tracking a change in a location of the eyes of the user in response to a motion of the vehicle; and
warping the AR graphic object based on the tracked change in the location of the eyes of the user.

10. The user interface apparatus according to claim 1, wherein the operations comprise:
based on the front view image information, generating frontal object information associated with an object located forward of the vehicle;
determining a first time corresponding to an estimated time of arrival of the vehicle at the object; and
changing, through the display unit, a location of the AR graphic object projected onto the screen based on the first time.

11. The user interface apparatus according to claim 10, wherein the operations comprise:
determining that the object is a bump;
based on the determination that the object is a bump, acquiring height information of the bump; and
based on the height information, generating, within the first time, a first anticipated motion information associated with a first anticipated motion of the vehicle at the bump.

12. The user interface apparatus according to claim 11, wherein the operations comprise:
receiving, through the interface unit, vehicle motion sensing information associated with the bump from an Inertial Measurement Unit (IMU);
based on the vehicle motion sensing information, generating second motion information associated with the bump; and
compensating the first anticipated motion information based on the second motion information.

13. The user interface apparatus according to claim 12, wherein the operations comprise:
determining that the object is a curved section;
based on the determination that the object is a curved section, acquiring curvature information of the curved section; and
based on the curvature information, generating, within the first time, a second anticipated motion information associated with a second anticipated motion of the vehicle at the curved section.

14. The user interface apparatus according to claim 1, wherein the display comprises:
an imaging unit configured to output the AR graphic object;
a flat mirror configured to reflect the AR graphic object; and
a concave mirror configured to reflect the AR graphic object reflected by the flat mirror toward the screen.

15. The user interface apparatus according to claim 14, wherein the display further comprises a flat mirror drive unit configured to adjust a position of the flat mirror, and
wherein the operations comprise:
warping the AR graphic object by adjusting, through the flat mirror drive unit, the position of the flat mirror.

16. A vehicle comprising:
a plurality of wheels;
a power source configured to drive at least one of the plurality of wheels; and
a user interface apparatus comprising:
an interface electrically connected to (i) a first camera of the vehicle configured to acquire front view image information and (ii) an Inertial Measurement Unit (IMU) of the vehicle configured to acquire vehicle motion sensing information;
a display configured to project an augmented reality (AR) graphic object onto a screen of the vehicle;
at least one processor; and
a computer-readable medium coupled to the at least one processor having stored thereon instructions which, when executed by the at least one processor, causes the at least one processor to perform operations comprising:
acquiring, through the interface, the front view image information from the first camera;
based on the front view image information, generating the AR graphic object;
acquiring, through the interface, the vehicle motion sensing information from the IMU; and
based on the vehicle motion sensing information, warping the AR graphic object,
wherein warping the AR graphic object comprises changing, through the display, a location of the AR graphic object projected onto the screen based on the vehicle motion sensing information.

17. The vehicle according to claim 16, wherein the operations further comprise:
based on the vehicle motion sensing information, generating second motion information associated with a second motion of the vehicle, the second motion information being defined with respect to a second coordinate system,
wherein changing the location of the AR graphic object further comprises changing, through the display, the location of the AR graphic object projected onto the screen based on the second motion information.

18. The vehicle according to claim 17, wherein changing the location of the AR graphic object projected onto the screen based on the second motion information comprises:
based on the second motion information, determining a second motion direction of the vehicle; and
changing the location of the AR graphic object in a direction opposite to the second motion direction of the vehicle.

19. The vehicle according to claim 17, wherein changing the location of the AR graphic object projected onto the screen based on the second motion information comprises:
based on the second motion information, determining a second displacement magnitude of the vehicle; and
changing the location of the AR graphic object in correspondence to the determined second displacement magnitude of the vehicle.

20. The vehicle according to claim 16, wherein the display comprises:
an imaging unit configured to output the AR graphic object;
a flat mirror configured to reflect the AR graphic object; and
a concave mirror configured to reflect the AR graphic object reflected by the flat mirror toward the screen.

* * * * *